US012720431B2

(12) United States Patent
Zorgui et al.

(10) Patent No.: US 12,720,431 B2
(45) Date of Patent: Aug. 25, 2026

(54) NETWORK POWER SAVING AND RF SENSING

(71) Applicant: QUALCOMM Incorporated, San Diego, CA (US)

(72) Inventors: Marwen Zorgui, San Diego, CA (US); Xiaoxia Zhang, San Diego, CA (US); Srinivas Yerramalli, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 566 days.

(21) Appl. No.: 18/306,125

(22) Filed: Apr. 24, 2023

(65) Prior Publication Data

US 2024/0357492 A1 Oct. 24, 2024

(51) Int. Cl.
*H04W 52/02* (2009.01)
*H04W 76/28* (2018.01)

(52) U.S. Cl.
CPC ....... *H04W 52/0225* (2013.01); *H04W 76/28* (2018.02)

(58) Field of Classification Search
CPC ............. H04W 52/0225; H04W 76/28; H04W 52/0229; H04W 52/0206
See application file for complete search history.

(56) References Cited

U.S. PATENT DOCUMENTS

2022/0053424 A1* 2/2022 Bao ..................... H04W 52/028
2023/0164735 A1* 5/2023 Si .......................... H04L 5/0091 455/456.1
2023/0269695 A1* 8/2023 Thomas ................ H04L 5/0051 455/456.1

FOREIGN PATENT DOCUMENTS

WO 2021154420 A1 8/2021
WO 2022055710 A1 3/2022
WO 2022082706 A1 4/2022

OTHER PUBLICATIONS

International Search Report and Written Opinion—PCT/US2024/022602—ISA/EPO—Jul. 31, 2024.

* cited by examiner

*Primary Examiner* — Walli Z Butt
(74) *Attorney, Agent, or Firm* — QUALCOMM Incorporated

(57) ABSTRACT

A method of wireless communication at a network entity is disclosed herein. The network entity obtains an indication of an NES mode, where the NES mode is supported by at least one of a set of network nodes or a UE. The network entity transmits, for at least one of the set of network nodes or the UE, a configuration for at least one of an RF sensing session, a set of sensing measurements, or a set of sensing signal transmissions based on the indication of the NES mode.

28 Claims, 21 Drawing Sheets

One Frame (TDD)
10 ms
subframe
slot
RB
subcarrier
OFDM symbol
DMRS R
CSI-RS
PDCCH CORESET
SSS
PSS
PDSCH
PBCH
REG 12 REs
1 CCE = 6 REGs
SS/PBCH Block
BWP
20 RBs
channel bandwidth RBs
PUCCH
PUSCH
SRS Comb 0
SRS Comb 1
SRS
200
230
250
280

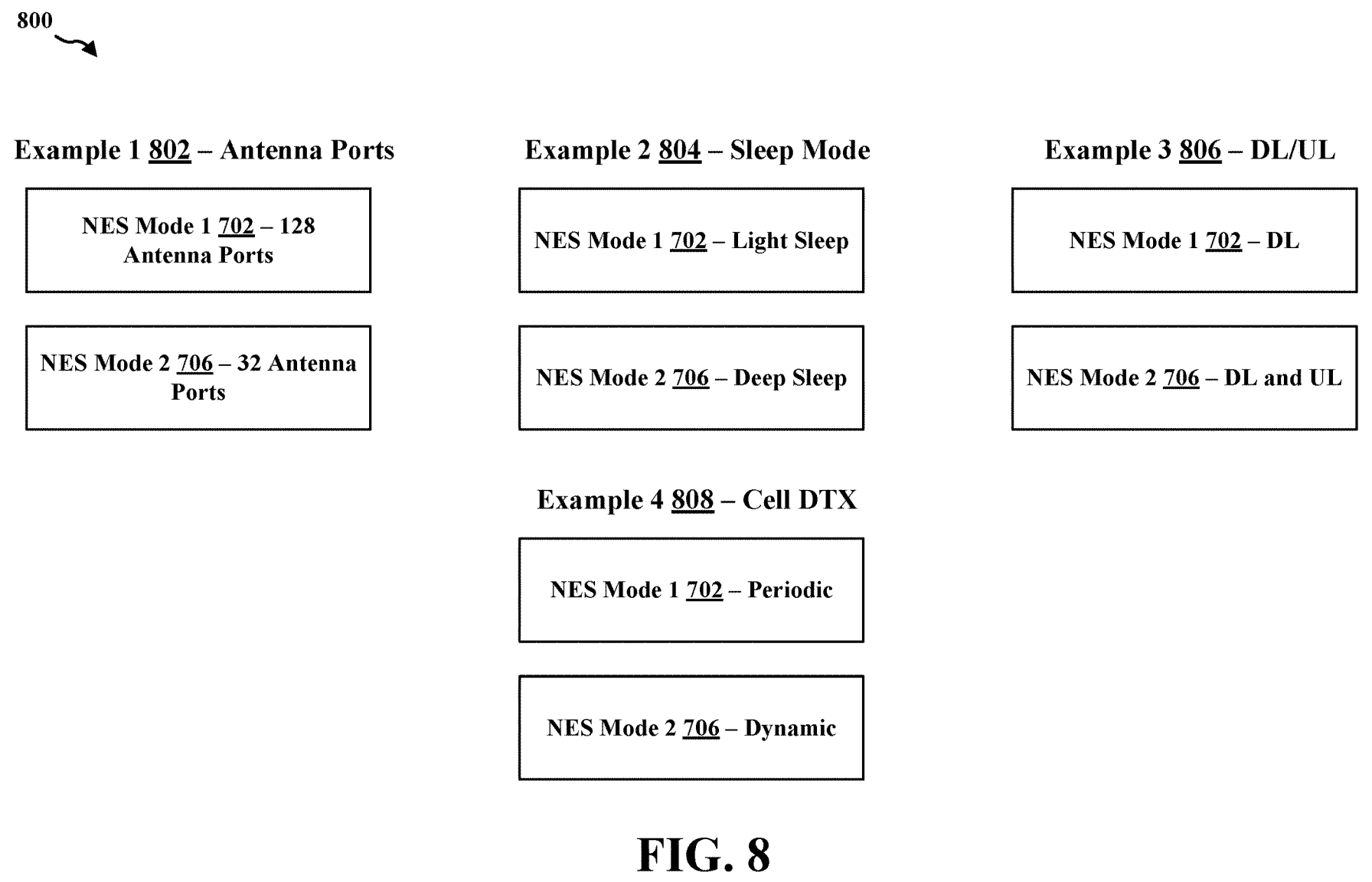

800

Example 1 802 – Antenna Ports

NES Mode 1 702 – 128 Antenna Ports

NES Mode 2 706 – 32 Antenna Ports

Example 2 804 – Sleep Mode

NES Mode 1 702 – Light Sleep

NES Mode 2 706 – Deep Sleep

Example 3 806 – DL/UL

NES Mode 1 702 – DL

NES Mode 2 706 – DL and UL

Example 4 808 – Cell DTX

NES Mode 1 702 – Periodic

NES Mode 2 706 – Dynamic

FIG. 8

NETWORK POWER SAVING AND RF SENSING

TECHNICAL FIELD

The present disclosure relates generally to communication systems, and more particularly, to network power saving and radio frequency (RF) sensing.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication at a network entity are provided. The apparatus includes a memory; and at least one processor coupled to the memory and, based at least in part on information stored in the memory, the at least one processor is configured to obtain an indication of a network energy saving (NES) mode, where the NES mode is supported by at least one of a set of network nodes or a user equipment (UE); and transmit, for at least one of the set of network nodes or the UE, a configuration for at least one of an RF sensing session, a set of sensing measurements, or a set of sensing signal transmissions based on the indication of the NES mode.

In an aspect of the disclosure, a method, a computer-readable medium, and an apparatus for wireless communication at a network node are provided. The apparatus includes a memory; and at least one processor coupled to the memory and, based at least in part on information stored in the memory, the at least one processor is configured to transmit an indication of a network energy saving (NES) mode, where the NES mode is supported by at least one of the network node or a user equipment (UE); and obtain a configuration for at least one of an RF sensing session, a set of sensing measurements, or a set of sensing signal transmissions based on the indication of the NES mode.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 8 is a diagram illustrating examples of different types of NES modes.

DETAILED DESCRIPTION

Figure 1:
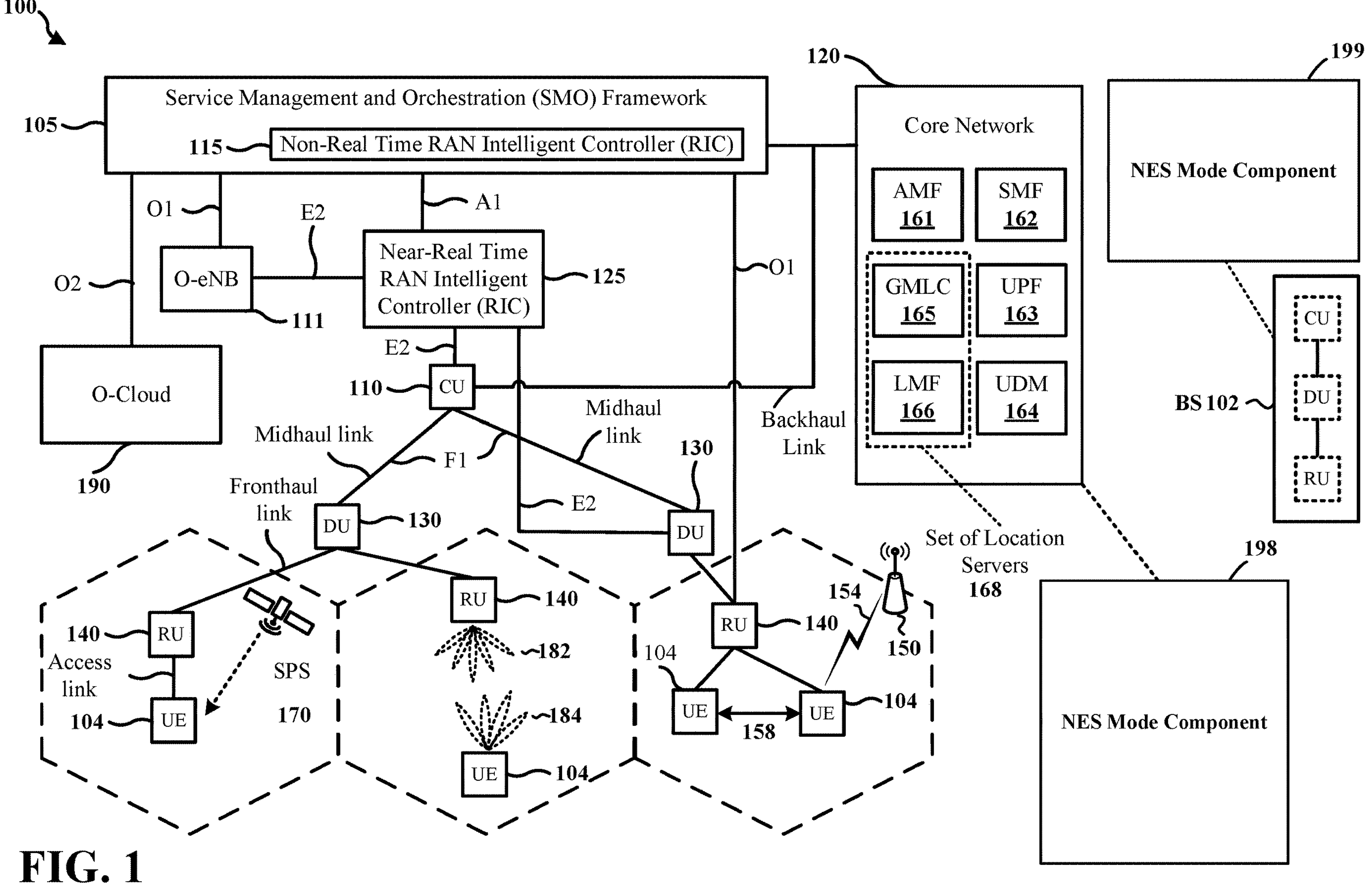
FIG. 1 is a diagram illustrating an example of a wireless communications system and an access network.

A network may implement a network energy saving (NES) mode in order to reduce energy/power consumption by UEs and/or network nodes in the network. For example, a network may reduce a number of antenna ports used by a UE for wireless communications in order to reduce power consumption of the UE. UEs and/or network nodes in a network may also be configured to perform RF sensing measurements and/or transmissions, where the RF sensing measurements and/or transmissions may be utilized for position, navigation, and timing purposes. In an example, the RF sensing measurements and/or transmissions may be utilized to ascertain a location of a UE. Some networks may not account for the impact of NES modes on RF sensing measurements and/or transmissions, and vice versa. For instance, some NES modes may not be compatible with some types of RF sensing measurements and/or transmissions.

Various aspects relating generally to network power saving and RF sensing are described herein. Some aspects more specifically relate to NES modes and RF sensing. In some examples, a network entity obtains an indication of an NES mode, where the NES mode is supported by at least one of a set of network nodes or a UE. The network entity transmits, for at least one of the set of network nodes or the UE, a configuration for at least one of an RF sensing session, a set of sensing measurements, or a set of sensing signal transmissions based on the indication of the NES mode.

Particular aspects of the subject matter described in this disclosure can be implemented to realize one or more of the following potential advantages. In some examples, by transmitting the configuration for at least one of the RF sensing session, the set of sensing measurements, or the set of sensing signal transmissions, the network entity may enable benefits of RF sensing measurements and/or transmissions to be realized (e.g., UE location determination) while conserving power/energy in the network via an NES mode. Thus, the above-described technologies may enable RF sensing measurements and/or transmissions to be performed in a manner that is consistent with NES modes.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-CNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHZ-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR2-2 (52.6 GHZ-71 GHz), FR4 (71 GHZ-114.25 GHZ), and FR5 (114.25 GHZ-300 GHZ). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the core network 120 may have an NES mode component 198 that may be configured to obtain an indication of an NES mode, where the NES mode is supported by at least one of a set of network nodes or a UE; and transmit, for at least one of the set of network nodes or the UE, a configuration for at least one of an RF sensing session, a set of sensing measurements, or a set of sensing signal transmissions based on the indication of the NES mode. In certain aspects, the base station 102 may have an NES mode component 199 that may be configured to transmit an indication of an NES mode, where the NES mode is supported by at least one of the network node or a UE; and obtain a configuration for at least one of an RF sensing session, a set of sensing measurements, or a set of sensing signal transmissions based on the indication of the NES mode. Although the following description may be focused on 5G NR, the concepts presented herein may be applicable to other types of wireless communication systems as well.

Figures 2A, 2B, 2C, 2D:
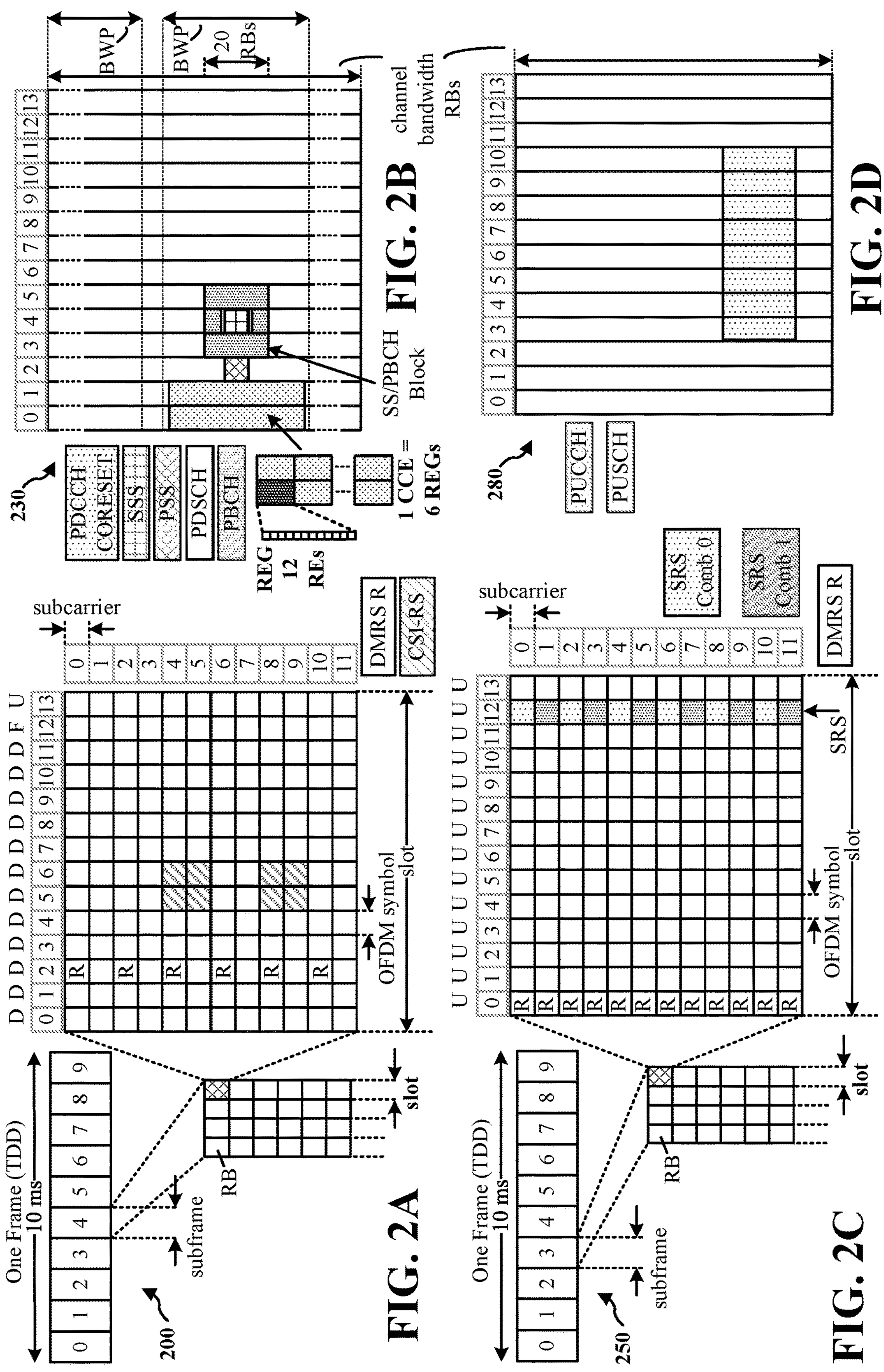
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| $\mu$ | SCS $\Delta f = 2^{\mu} \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and 24 slots/subframe. The subcarrier spacing may be equal to $2^{a}$ *15 kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
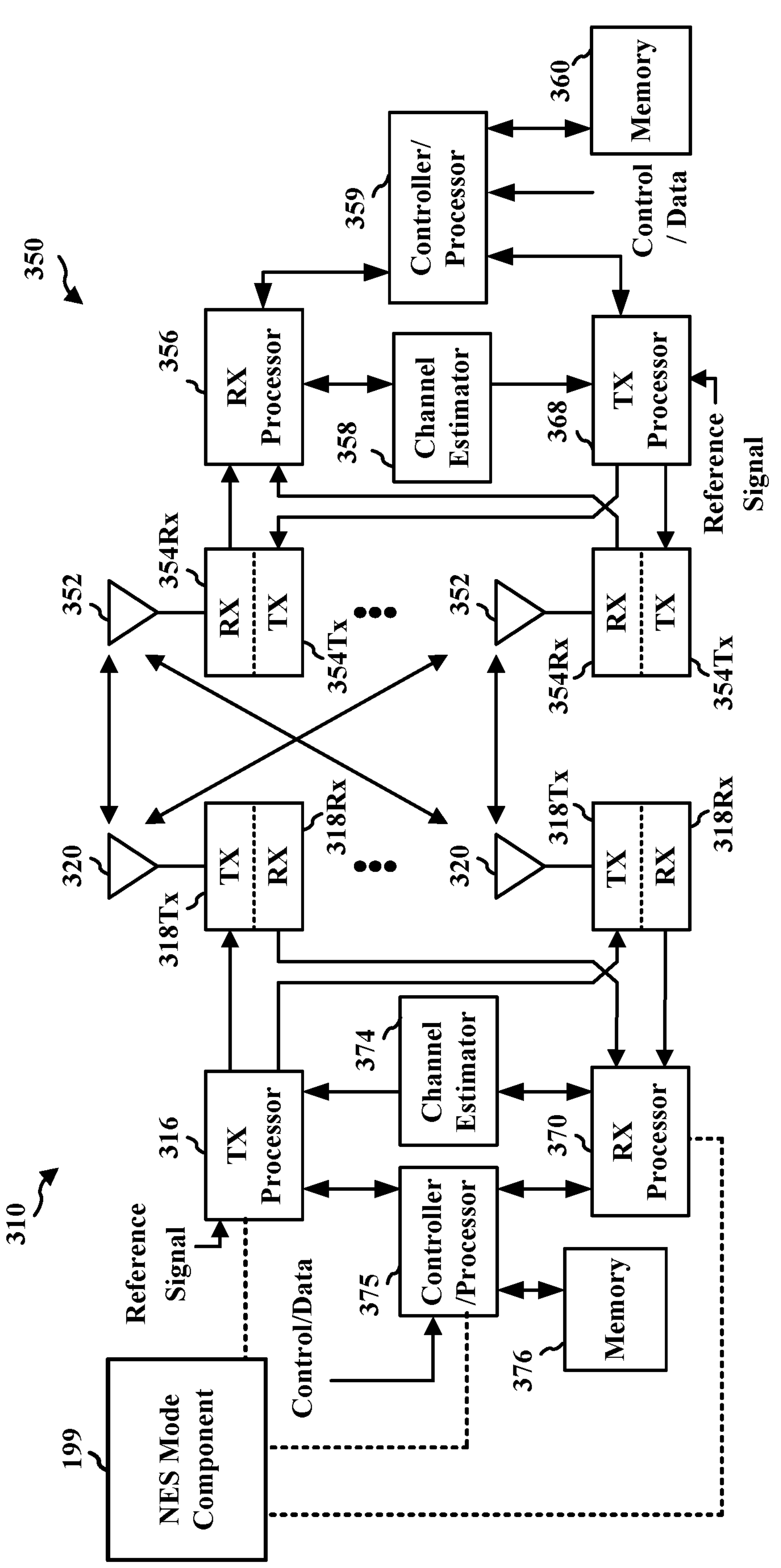
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 316, the RX processor 370, and the controller/processor 375 may be configured to perform aspects in connection with the NES mode component 199 of FIG. 1.

Figure 4:
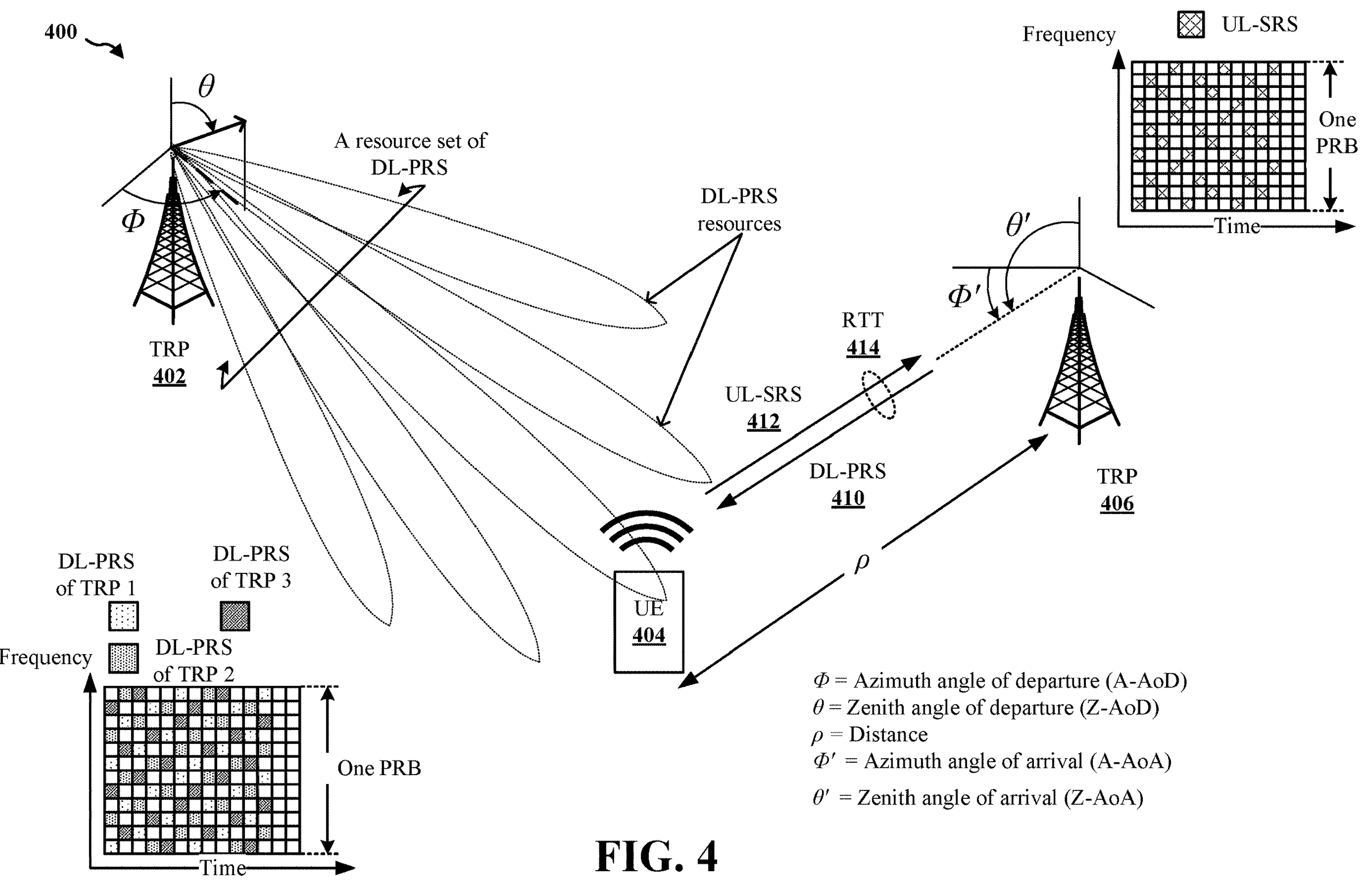
FIG. 4 is a diagram illustrating an example of a UE positioning based on reference signal measurements.

FIG. 4 is a diagram 400 illustrating an example of a UE positioning based on reference signal measurements. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $\|T_{SRS\_RX}-T_{PRS\_TX}|-|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Figure 5:
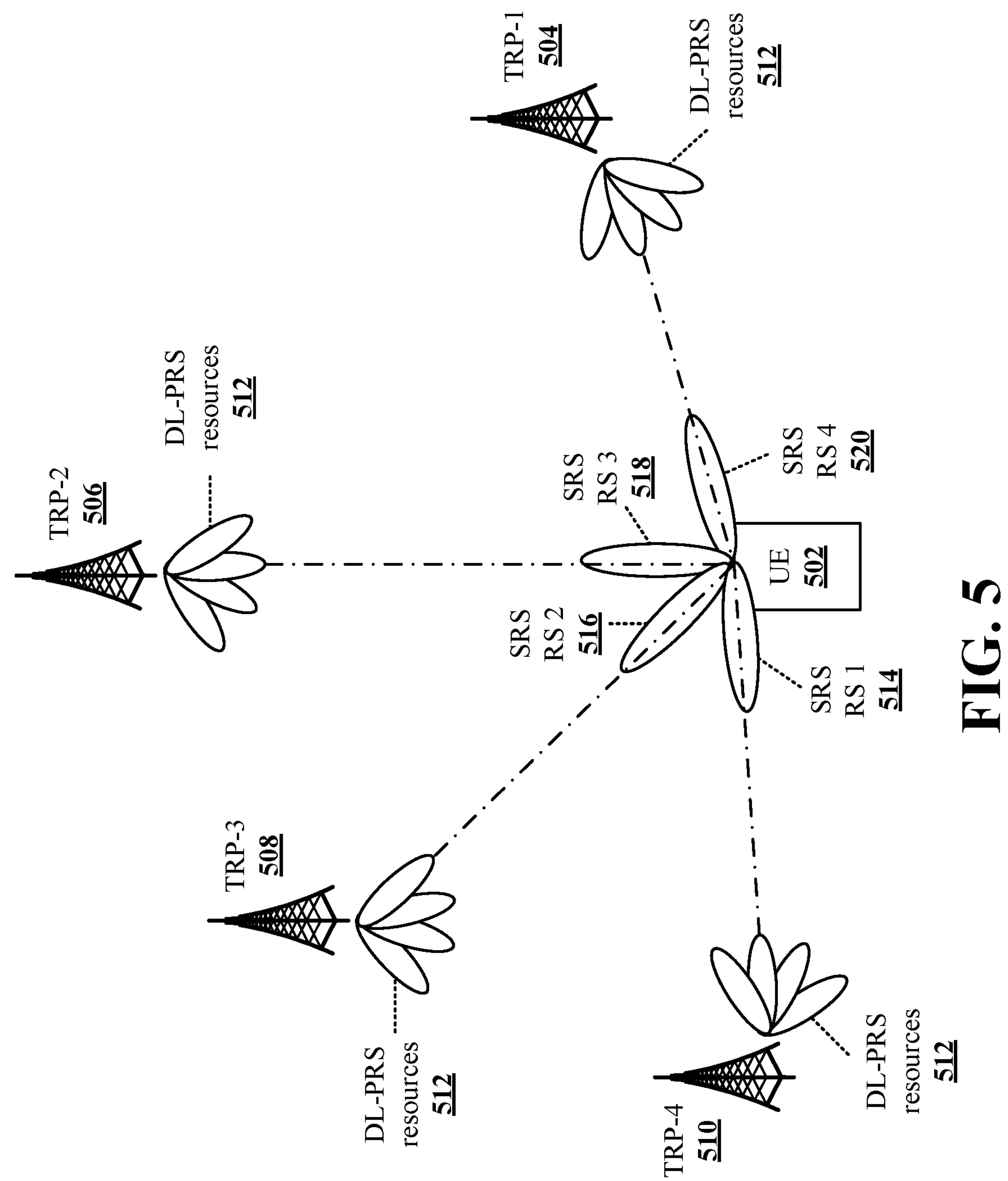
FIG. 5 is a diagram illustrating an example of a wireless communication system.

FIG. 5 is a diagram 500 illustrating an example of estimating a position of a UE based on multi-RTT measurements from multiple TRPs in accordance with various aspects of the present disclosure. A UE 502 may be configured by a serving base station to decode DL-PRS resources 512 that correspond to and are transmitted from a first TRP 504 (TRP-1), a second TRP 506 (TRP-2), a third TRP 508 (TRP-3), and a fourth TRP 510 (TRP-4). The UE 502 may also be configured to transmit UL-SRSs on a set of UL-SRS resources, which may include a first SRS resource 514, a second SRS resource 516, a third SRS resource 518, and a fourth SRS resource 520, such that the serving cell(s), e.g., the first TRP 504, the second TRP 506, the third TRP 508, and the fourth TRP 510, and as well as other neighbor cell(s), may be able to measure the set of the UL-SRS resources transmitted from the UE 502. For multi-RTT measurements based on DL-PRS and UL-SRS, as there may be an association between a measurement of a UE for the DL-PRS and a measurement of a TRP for the UL-SRS, the smaller the gap is between the DL-PRS measurement of the UE and the UL-SRS transmission of the UE, the better the accuracy may be for estimating the position of the UE and/or the distance of the UE with respect to each TRP.

In some aspects of wireless communication, the terms "positioning reference signal" and "PRS" may generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. In some aspects, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS. PTRS), the signals may be prepended with "UL" or "DL" to distinguish the direction. For example, "UL-DMRS" may be differentiated from "DL-DMRS."

Figure 6:
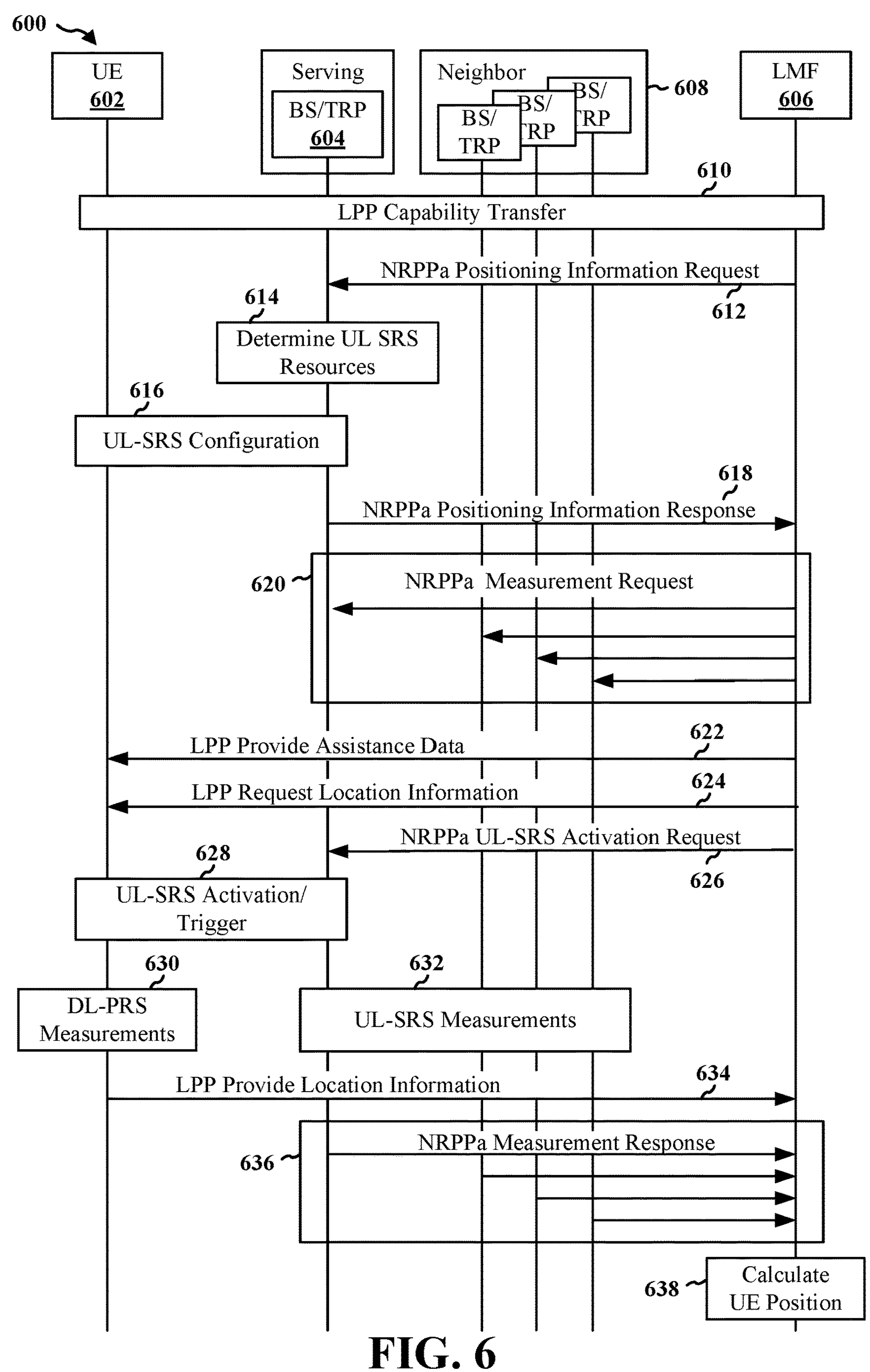
FIG. 6 is a diagram illustrating an example positioning procedure.

FIG. 6 is a communication flow 600 illustrating an example multi-RTT positioning procedure in accordance with various aspects of the present disclosure. The numberings associated with the communication flow 600 do not specify a particular temporal order and are merely used as references for the communication flow 600. In addition, a DL-only and/or an UL-only positioning may use a subset or subsets of this multi-RTT positioning procedure.

At 610, an LMF 606 may request one or more positioning capabilities from a UE 602 (e.g., from a target device). In some examples, the request for the one or more positioning capabilities from the UE 602 may be associated with an LTE Positioning Protocol (LPP). For example, the LMF 606 may request the positioning capabilities of the UE 602 using an LPP capability transfer procedure. At 612, the LMF 606 may request UL SRS configuration information for the UE 602. The LMF 606 may also provide assistance data specified by a serving base station 604 (e.g., pathloss reference, spatial relation, and/or SSB configuration(s), etc.). For example, the LMF 606 may send an NR Positioning Protocol A (NRPPa) positioning information request message to the serving base station 604 to request UL information for the UE 602.

At 614, the serving base station 604 may determine resources available for UL SRS, and at 616, the serving base station 604 may configure the UE 602 with one or more UL SRS resource sets based on the available resources. At 618, the serving base station 604 may provide UL SRS configuration information to the LMF 606, such as via an NRPPa positioning information response message. At 620, the LMF 606 may select one or more candidate neighbor BSs/TRPs 608, and the LMF 606 may provide an UL SRS configuration to the one or more candidate neighbor BSs/TRPs 608 and/or the serving base station 604, such as via an NRPPa measurement request message. The message may include information for enabling the one or more candidate neighbor BSs/TRPs 608 and/or the serving base station to perform the UL measurements.

At 622, the LMF 606 may send an LPP provide assistance data message to the UE 602. The message may include specified assistance data for the UE 602 to perform the DL measurements. At 624, the LMF 606 may send an LPP request location information message to the UE 602 to request multi-RTT measurements. At 626, for semi-persistent or aperiodic UL SRS, the LMF 606 may request the serving base station 604 to activate/trigger the UL SRS in the UE 602. For example, the LMF 606 may request activation of UE SRS transmission by sending an NRPPa positioning activation request message to the serving base station 604.

At 628, the serving base station 604 may activate the UE SRS transmission and send an NRPPa positioning activation response message. In response, the UE 602 may begin the UL-SRS transmission according to the time domain behavior of UL SRS resource configuration. At 630, the UE 602 may perform the DL measurements from the one or more candidate neighbor BSs/TRPs 608 and/or the serving base station 604 provided in the assistance data. At 632, each of the configured one or more candidate neighbor BSs/TRPs 608 and/or the serving base station 604 may perform the UL measurements. At 634, the UE 602 may report the DL measurements to the LMF 606, such as via an LPP provide location information message. At 636, each of the one or more candidate neighbor BSs/TRPs 608 and/or the serving base station 604 may report the UL measurements to the LMF 606, such as via an NRPPa measurement response message. At 638, the LMF 606 may determine the RTTs from the UE 602 and BS/TRP Rx-Tx time difference measurements for each of the one or more candidate neighbor BSs/TRPs 608 and/or the serving base station 604 for which corresponding UL and DL measurements were provided at 634 and 636, and the LMF 606 may calculate the position of the UE 602.

Some aspects of wireless communication may utilize different types of positioning reference signals (PRSs), such as downlink (DL) PRSs. PRSs are utilized by different wireless communications (e.g., new radio (NR)) and positioning methods in order to enable devices (e.g., UEs) to detect and measure different objects. For example, PRSs may enable UEs to detect and measure an increased about of neighbor TRPs or base stations. Several different types of positioning configurations are supported in wireless communications in order to enable a variety of deployments or environments for the devices or UEs (e.g., indoor environments, outdoor environments, sub-6 environments, mmW environments). Both UE-assisted positioning methods (e.g., calculations) and UE-based position methods are supported by different types of wireless communications (e.g., NR). Further, some types of positioning methods may be supported by specific types of wireless communication (e.g., NR). For instance, NR positioning methods may support at least one of: NR multiple round trip time (multi-RTT) positioning. NR downlink (DL) time difference of arrival (DL-TDOA) positioning, or NR DL angle of departure (DL-AoD) positioning.

In some aspects, different types of reference signals (e.g., downlink (DL) or uplink (UL) reference signals) and UE measurements may be utilized to facilitate the support of different positioning techniques. For example, DL PRSs and DL reference signal time difference (RSTD) UE measurements may facilitate support of DL-TDOA positioning. Also, DL PRSs and DL PRS reference signal received power (RSRP) UE measurements may facilitate support of DL-TDOA positioning. DL-AoD positioning, and/or multi-RTT positioning. Moreover, DL PRSs and sounding reference signals (SRS) for positioning and UE reception (Rx)-transmission (Tx) time different UE measurements may facilitate support of multi-RTT positioning. Further, synchronization signal blocks (SSBs) and channel state information (CSI)-reference signals (CSI-RSs) for radio resource management (RRM), as well as synchronization signal (SS)-RSRP (e.g., RSRP for RRM), SS-reference signal received quality (SS-RSRQ) (e.g., for RRM), CSI-RSRP (e.g., for RRM), and CSI-RSRP (e.g., for RRM), may facilitate support of enhanced-cell identifier (ID) (E-CID) positioning.

Different aspects of positioning may also utilize preconfigured DL PRS assistance data (AD). Preconfigured DL PRS AD may refer to the DL-PRS assistance data (with associated validity criteria) that may be provided to the UE (e.g., before or during an ongoing LTE positioning protocol (LPP) positioning session), to be then utilized for potential positioning measurements at a subsequent time (e.g., for deferred mobile terminated location request (MT-LR)). In some aspects, pre-configured DL-PRS assistance data may include multiple instances, where each instance may be applicable to a different area within the network. Also, each DL-PRS assistance data instance may be associated with an area ID. In some instances, the area ID may include a list of cells where the UE may be camped on/connected. Further, an applicable area ID at the UE location may be selected based on the cell where the UE is camped on/connected. The instance of the assistance data may be valid/selected if the UE is camped on/connected to one of the cells indicated within the list of cells in the area ID.

Figure 7:
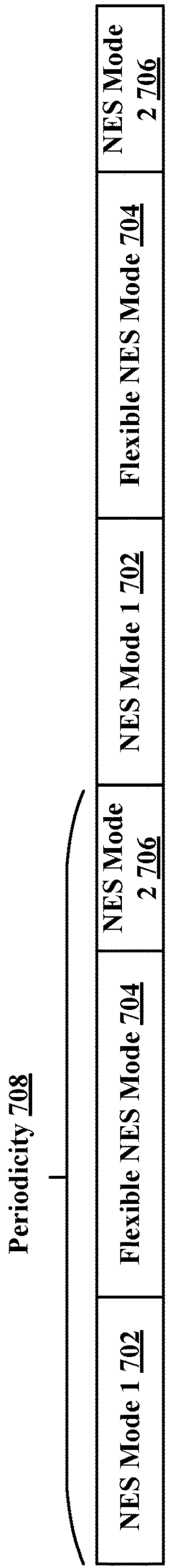
FIG. 7 is a diagram illustrating example aspects of network energy saving (NES) modes.

FIG. 7 is a diagram 700 illustrating example aspects of network energy saving (NES) modes. A network may utilize different NES modes and/or operations in order to save energy/power and maintain network operation. An NES mode may refer to a specific operation by a network that saves energy/power. An NES mode may also be referred to as a network energy saving state. An NES mode may be semi-static or dynamic. A semi-static NES mode may be applied in a regular or semi-regular manner. A dynamic NES mode may be activated by a reception and/or a transmission of signal(s) and/or data. A network may switch NES modes (i.e., power modes) according to network input. In an example, an NES mode may include bandwidth adaptation, antenna adaptation, and/or transmit power adaptation. An NES mode may be signaled to a UE and/or a network node in order for the UE and/or the network node to apply a configuration/behavior associated with the NES mode.

In an example, a network node and/or a UE may be configured with a first NES mode 702, a flexible NES mode 704, and a second NES mode 706. The first NES mode 702, the flexible NES mode 704, and the second NES mode 706 may recur with a periodicity 708. In an example, the first NES mode 702 may be associated with a first set of energy/power saving characteristics and the second NES mode 706 may be associated with a second set of energy/power saving characteristics. The flexible NES mode 704 may be a flexible mode that is dynamically indicated by a network based on current network traffic conditions. For instance, the flexible NES mode 704 may be the first NES mode 702, the second NES mode 706, another NES mode, or a mode unassociated with network energy/power savings (e.g., normal network operation). Additionally, the network node and/or the UE may be configured for periods of normal network operation in addition to the first NES mode 702, the flexible NES mode 704, and the second NES mode 706.

FIG. 8 is a diagram 800 illustrating examples of different types of NES modes. In a first example 802, the first NES mode 702 may be a mode of operation in which a network (e.g., a network node, such as a base station) serves a UE with 64 antenna ports and the second NES mode 706 may be a mode of operation in which the network serves the UE with 32 antenna ports. Serving the UE with 32 antenna ports may be associated with reduced energy/power consumption in comparison to serving the UE with 64 antenna ports.

In a second example 804, the first NES mode 702 may be a mode of operation in which the UE utilizes a light sleep mode when sleeping and the second NES mode 706 may be a mode of operation in which the UE utilizes a deep sleep mode when sleeping. The deep sleep mode may be associated with reduced energy/power consumption in comparison to the light sleep mode. For instance, a UE may execute a fewer number of background processes when in the deep sleep mode compared to a number of background processes executed by the UE when in light sleep mode.

In a third example 806, the first NES mode 702 may be a mode of operation that applies to DL communications and the second NES mode 706 may be a mode of operation that applies to both DL communications and UL communications. For instance, a UE (and/or a network node) may implement power saving characteristics for DL communications (and not UL communications) in the first NES mode 702 and the UE (and/or a network node) may implement power saving characteristics for DL communications and UL communications in the second NES mode 706.

In a fourth example 808, the first NES mode 702 may be a mode of operation associated with periodic cell discontinuous transmission (DTX) and the second NES mode 706 may be a mode of operation associated with dynamic cell DTX. Cell DTX will be discussed in greater detail below.

Figure 9:
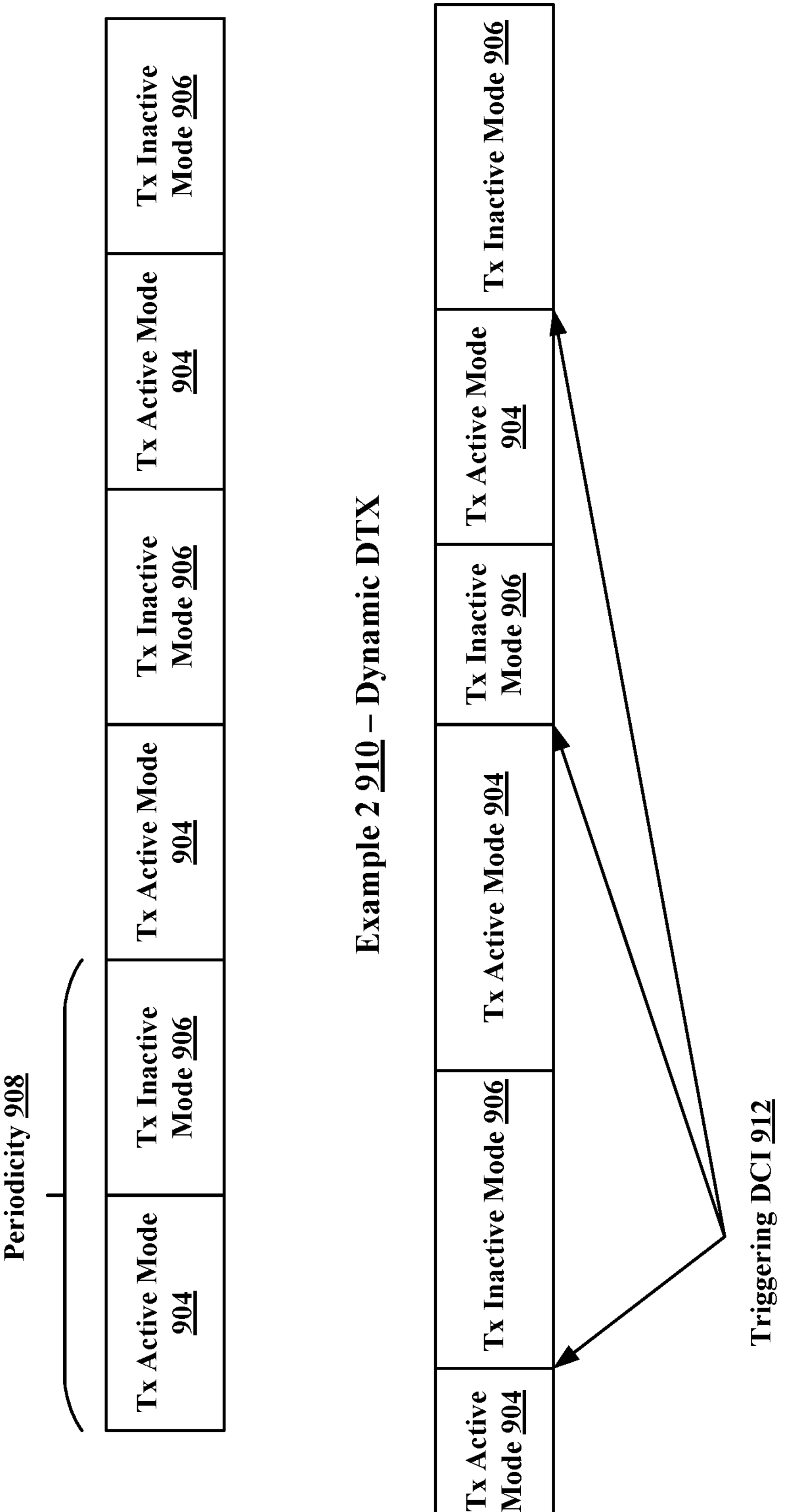
FIG. 9 is a diagram illustrating example aspects of cell discontinuous transmission (DTX) behavior.

FIG. 9 is a diagram 900 illustrating example aspects of cell discontinuous transmission (DTX) behavior. DTX behavior may refer to a behavior where a network node (e.g., a base station, a gNB) has an opportunity to be inactive. During an inactive duration, the network node may not transmit some periodic signals/channels, such as common signals/channels or UE-specific signals/channels. During the inactive duration, the network node may not transmit signals/channels or the network node may transmit a limited set of signals/channels. In one aspect, a base station may not skip a transmission of a SSB in the inactive duration associated with cell DTX. In one aspect, a period of the inactive duration (i.e., a DTX period) may be less than a period associated with a transmission of a SSB. In one aspect, when entering an inactive duration associated with cell DTX, the network node may transmit indications for UEs indicating that the UEs are to stop monitoring a PDCCH and that the UEs are to cease measuring CSI-RS. Cell DTX may also be referred to as DTX.

Cell DTX may be related to discontinuous reception (DRX). During DRX, a network node (e.g., a base station, a gNB) may have an opportunity to be inactive. During an inactive duration, the network node may not receive some periodic signals/channels, such as common signals/channels or UE-specific signals/channels. During the inactive duration, the network node may not receive signals/channels or the network node may receive a limited set of signals/channels. In connected mode DRX (C-DRX), DRX cycles or offsets configured for UEs in connected mode or idle/inactive mode may be aligned, potentially providing longer inactivity periods at a network node and thus reducing a number of activities performed (e.g., transmission of a SSB, a configured grant (CG) PUSCH, a RACH occasion (RO), etc.) by the network node outside of a UE DRX active time.

In one aspect, a network node may enter into an inactive state for a period of time associated with a network adaptation of DTX/DRX. For instance, in DTX/DRX, a network node (e.g., a base station) may enter into an inactive state with different time granularities. In some instance, C-DRX may be configured on a per UE basis, and a DTX period for one UE may be an active time for another UE, depending on a scheduler. In such an instance, the base station may schedule different UEs on different time periods, and a time left for network node inactivity may be limited. Alignment of DRX cycles and/or offsets may be performed via RRC reconfiguration. DTX/DRX may be configured to increase an inactivity period (i.e., increase an inactive duration). In one aspect, a UE may monitor certain channels/signals outside of an active DRX time, which may lead to a corresponding decrease in network node activity time.

In a first example 902, DTX may be configured with a periodic pattern (e.g., a predefined periodic pattern). For instance, a Tx active mode 904 may be followed by a Tx inactive mode 906, where the Tx active mode 904 and the Tx inactive mode 906 may recur with a periodicity 908. In the first example 902, each instance of the Tx active mode 904 may have the same duration and each instance of the Tx inactive mode 906 may have the same duration.

In a second example 910, DTX may be configured dynamically, that is, a network node Tx inactive state (e.g., a base station Tx inactive state) may be dynamically activated via a triggering DCI 912. For instance, if the Tx active mode 904 is currently active, the Tx inactive mode 906 may be activated by the triggering DCI 912. In the second example 910, each instance of the Tx active mode 904 may have the same duration or a different duration and each instance of the Tx inactive mode 906 may have the same duration or a different duration based on a time at which the triggering DCI 912 is transmitted (or received).

A network may implement a network energy saving (NES) mode in order to reduce energy/power consumption by UEs and/or network nodes in the network. For example, a network may reduce a number of antenna ports used by a UE for wireless communications in order to reduce power consumption of the UE. UEs and/or network nodes in a network may also be configured to perform RF sensing measurements and/or transmissions, where the RF sensing measurements and/or transmissions may be utilized for position, navigation, and timing purposes. In an example, the RF sensing measurements and/or transmissions may be utilized to ascertain a location of a UE. Some networks may not account for the impact of NES modes on RF sensing measurements and/or transmissions, and vice versa. For instance, some NES modes may not be compatible with some types of RF sensing measurements and/or transmissions.

Various technologies pertaining to network power saving and RF sensing are described herein. In an example, a network entity obtains an indication of an NES mode, where the NES mode is supported by at least one of a set of network nodes or a UE. The network entity transmits, for at least one of the set of network nodes or the UE, a configuration for at least one of an RF sensing session, a set of sensing measurements, or a set of sensing signal transmissions based on the indication of the NES mode. Vis-à-vis the above-described technologies, RF sensing measurements and/or transmissions may be performed in a manner that is consistent with NES modes. For instance, by transmitting the configuration for at least one of the RF sensing session, the set of sensing measurements, or the set of sensing signal transmissions, the network entity may enable benefits of RF sensing measurements and/or transmissions to be realized (e.g., UE location determination) while conserving power/energy in the network via an NES mode.

NES modes may enable different operations to save power while maintaining network operation. In one aspect, an NES mode may be shared along with the sensing mode to configure adapted RF sensing sessions, measurements, and/or transmissions. Certain RF sensing measurements may be supported in certain NES modes and not in other NES modes. For example, Doppler processing may be associated with a TRP that transmits and/or receives a reference signal for a long duration of time that can span multiple NES cycles. In another example, in certain NES modes with antenna adaptation/reduction, angle maps may not be reliably obtained due to a limited number of antennas, and hence angle maps may not be supported in such NES modes.

Figure 10:
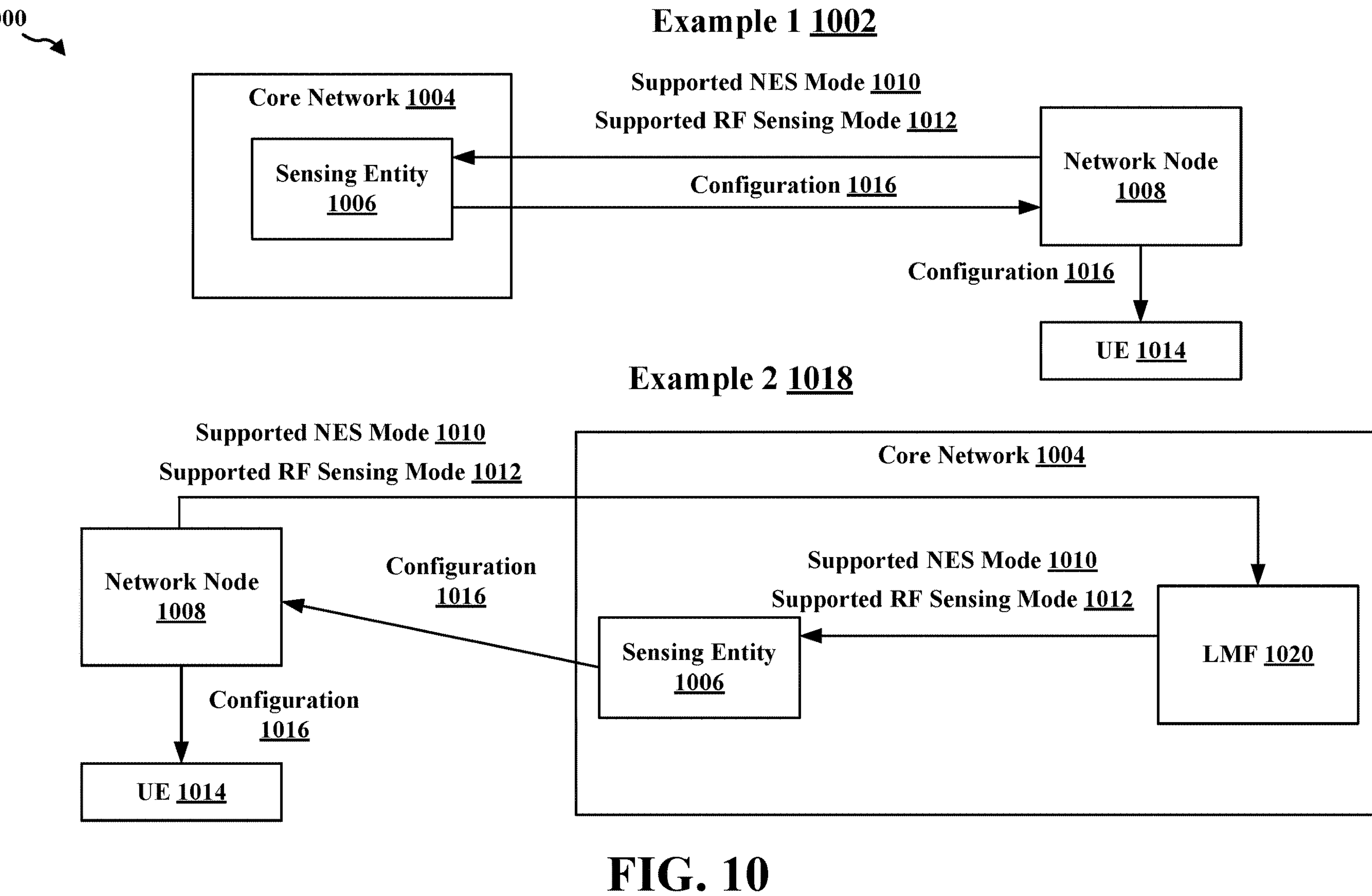
FIG. 10 is a diagram illustrating examples of sharing a supported NES mode and a supported radio frequency (RF) sensing mode with a sensing entity.

FIG. 10 is a diagram 1000 illustrating examples of sharing a supported NES mode and a supported radio frequency (RF) sensing mode with a sensing entity. Knowledge of an NES mode configuration (e.g., a semi-static NES mode configuration) may enable a sensing entity to configure adapted RF sensing sessions, sensing measurements, and/or sensing transmissions. For instance, certain RF sensing measurements may be supported in some NES modes, but not other NES modes. In order for the sensing entity to configure adapted RF sensing sessions, sensing measurements, and/or sensing transmissions, the sensing entity may be informed as to supported RF sensing measurements (or sensing transmissions) per NES mode. In one example, in order to support Doppler processing, a TRP may transmit or receive a reference signal for a duration of time that spans multiple NES cycles (e.g., multiple instances of different NES modes being active). In another example, for an NES mode associated with antenna adaptation/reduction (e.g., such as in the first example 802), angle maps may not be reliably obtained due to a limited number of antennas supported by a particular NES mode, and hence angle maps may not be supported by the particular NES mode.

In a first example 1002, a core network 1004 (e.g., the core network 120) may include a sensing entity 1006. The sensing entity 1006 may be a core network entity that is responsible for managing and coordinating sensing sessions. A sensing session may refer to a period of time in which sensing measurements are performed and/or in which sensing signal transmissions are transmitted. A network node 1008 (e.g., a gNB) may transmit an indication of a supported NES mode 1010 and/or an indication of a supported RF sensing mode 1012 to the sensing entity 1006. The supported NES mode 1010 may also be referred to as an NES configuration. In one aspect, the supported NES mode 1010 may refer to a semi-static configuration supported and implemented by a network (e.g., the network node 1008) for the purpose of saving network energy/power. For instance, the supported NES mode 1010 may be in the form of NES mode changes and/or DTX cycles. The supported NES mode 1010 and/or the supported RF sensing mode 1012 may be supported by the network node 1008 and/or a UE 1014. In an example, the supported NES mode 1010 may be or include aspects described in one or more of the first example 802, the second example 804, the third example 806, and/or the fourth example 808 of FIG. 8. In an example, the supported RF sensing mode 1012 may include Doppler-related sensing and/or angle map related sensing. In one aspect, the network node 1008 may transmit the indication of the supported NES mode 1010 and/or the indication of the supported RF sensing mode 1012 based on receiving a request transmitted by the sensing entity 1006. In another aspect, the network node 1008 may transmit the indication of the supported NES mode 1010 and/or the indication of the supported RF sensing mode 1012 without receiving a request from the sensing entity 1006.

The sensing entity 1006 may generate a configuration 1016 for an RF sensing session, a set of sensing measurements, and/or a set of sensing signal transmissions based on the indication of the supported NES mode 1010 and/or the indication of the supported RF sensing mode 1012. The configuration 1016 may be for the network node 1008 and/or the UE 1014. The sensing entity 1006 may transmit the configuration 1016 to the network node 1008. The sensing entity 1006 may transmit the configuration 1016 to the UE 1014.

In a second example 1018, the network node 1008 may transmit the indication of the supported NES mode 1010 and/or the indication of the supported RF sensing mode 1012 to a LMF 1020 (e.g., the LMF 166, the LMF 606) of the core network 1004. In one aspect, the network node 1008 may transmit the indication of the supported NES mode 1010 and/or the indication of the supported RF sensing mode 1012 upon receiving a request transmitted by the LMF 1020. In another aspect, the network node 1008 may transmit the indication of the supported NES mode 1010 and/or the indication of the supported RF sensing mode 1012 without receiving a request from the LMF 1020. The LMF 1020 may transmit the indication of the supported NES mode 1010 and/or the indication of the supported RF sensing mode 1012 to the sensing entity 1006. For instance, the LMF 1020 may transmit the indication of the supported NES mode 1010 and/or the indication of the supported RF sensing mode 1012 via a signaling protocol defined between the LMF 1020 and the sensing entity 1006, where assistance data may be shared via the signaling protocol. The assistance data may be or include the indication of the supported NES mode 1010 and/or the indication of the supported RF sensing mode 1012. The sensing entity 1006 may generate the configuration 1016 as described above and the sensing entity 1006 may transmit the configuration 1016 to the network node 1008. The network node 1008 may transmit the configuration 1016 to the UE 1014.

In both the first example 1002 and the second example 1018, the network node 1008 and/or the UE 1014 may perform an RF sensing session, a set of sensing measurements, and/or a set of sensing signal transmissions based on the configuration 1016. Subsequently, the network node 1008 may transmit an update request to the sensing entity 1006, where the update request may be associated with a different NES mode than an NES mode associated with the supported NES mode 1010 and/or a different RF sensing mode associated with the supported RF sensing mode 1012. The sensing entity 1006 may generate a second configuration based on the update request, where the second configuration is for the network node 1008 and/or the UE 1014. The sensing entity 1006 may transmit the second configuration to the network node 1008. The network node 1008 may transmit the second configuration to the UE 1014. The network node 1008 and/or the UE 1014 may perform a second RF sensing session, a second set of sensing measurements, and/or a second set of sensing signal transmissions based on the second configuration.

Figure 11:
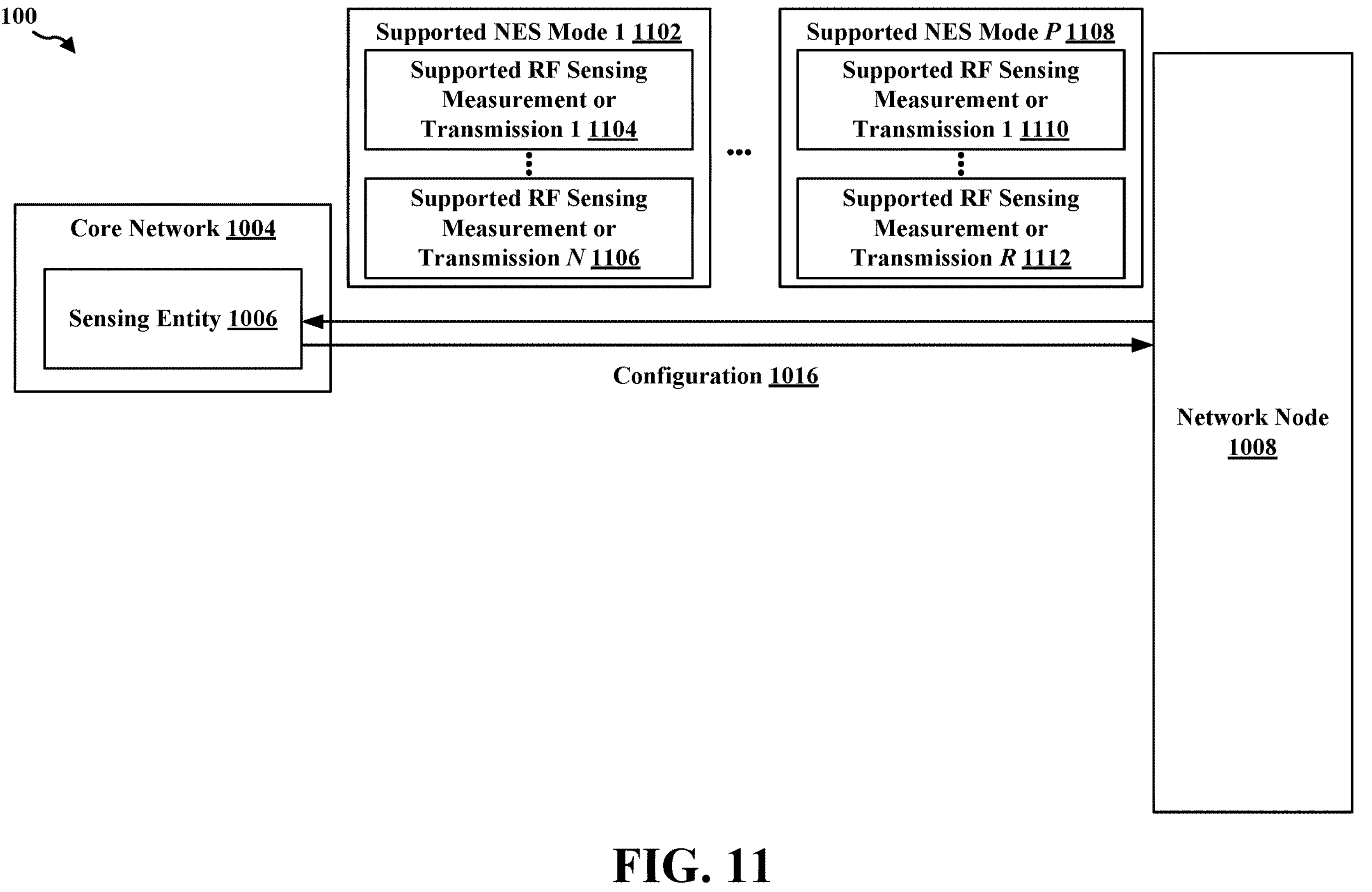
FIG. 11 is a diagram illustrating an example of sharing supported RF sensing measurements or transmissions per supported NES mode with a sensing entity.

FIG. 11 is a diagram 1100 illustrating an example of sharing supported RF sensing measurements or transmissions per supported NES mode with a sensing entity. In some scenarios, RF sensing (e.g., an RF sensing session, performing a set of sensing measurements, and/or transmitting sensing signal transmissions) may be a higher priority than saving network energy. For instance, an RF sensing session may be aperiodic (i.e., the RF sensing session may happen infrequently), whereas network energy saving may be beneficial over relatively long periods of time and not beneficial during a relatively short period of time. As such, a network (e.g., a network node) may signal RF sensing measurements and/or transmissions supported per NES mode to a sensing entity.

In one aspect, the network node 1008 may transmit an indication of a first supported NES mode 1102, where the first supported NES mode 1102 is supported by the network node 1008 and/or the UE 1014 (not depicted in FIG. 11). The network node 1008 may also transmit an indication of a first supported RF sensing measurement or transmission 1104 and an indication of an Nth supported RF sensing measurement or transmission 1106, where N is a positive integer greater than one, and where the first supported RF sensing measurement or transmission 1104 and the Nth supported RF sensing measurement or transmission 1106 are supported by the first supported NES mode 1102. The network node 1008 may transmit an indication of a Pth supported NES mode 1108, where P is a positive integer greater than one, and where the Pth supported NES mode 1108 is supported by the network node 1008 and/or the UE 1014 (not depicted in FIG. 11). The network node 1008 may also transmit an indication of a first supported RF sensing measurement or transmission 1110 and an indication of an Rth supported RF sensing measurement or transmission 1112, where R is a positive integer greater than one, and where the first supported RF sensing measurement or transmission 1110 and the Rth supported RF sensing measurement or transmission 1112 are supported by the Pth supported NES mode 1108. The sensing entity 1006 may generate the configuration 1016 based on the first supported NES mode 1102, the first supported RF sensing measurement or transmission 1104 supported by the first supported NES mode 1102, the Nth supported RF sensing measurement or transmission 1106 supported by the first supported NES mode 1102, the Pth supported NES mode 1108, the first supported RF sensing measurement or transmission 1110, and/or the Rth supported RF sensing measurement or transmission 1112 supported by the Pth supported NES mode 1108. The sensing entity 1006 may transmit the configuration 1016 for the network node 1008 and/or the UE 1014.

Figure 12:
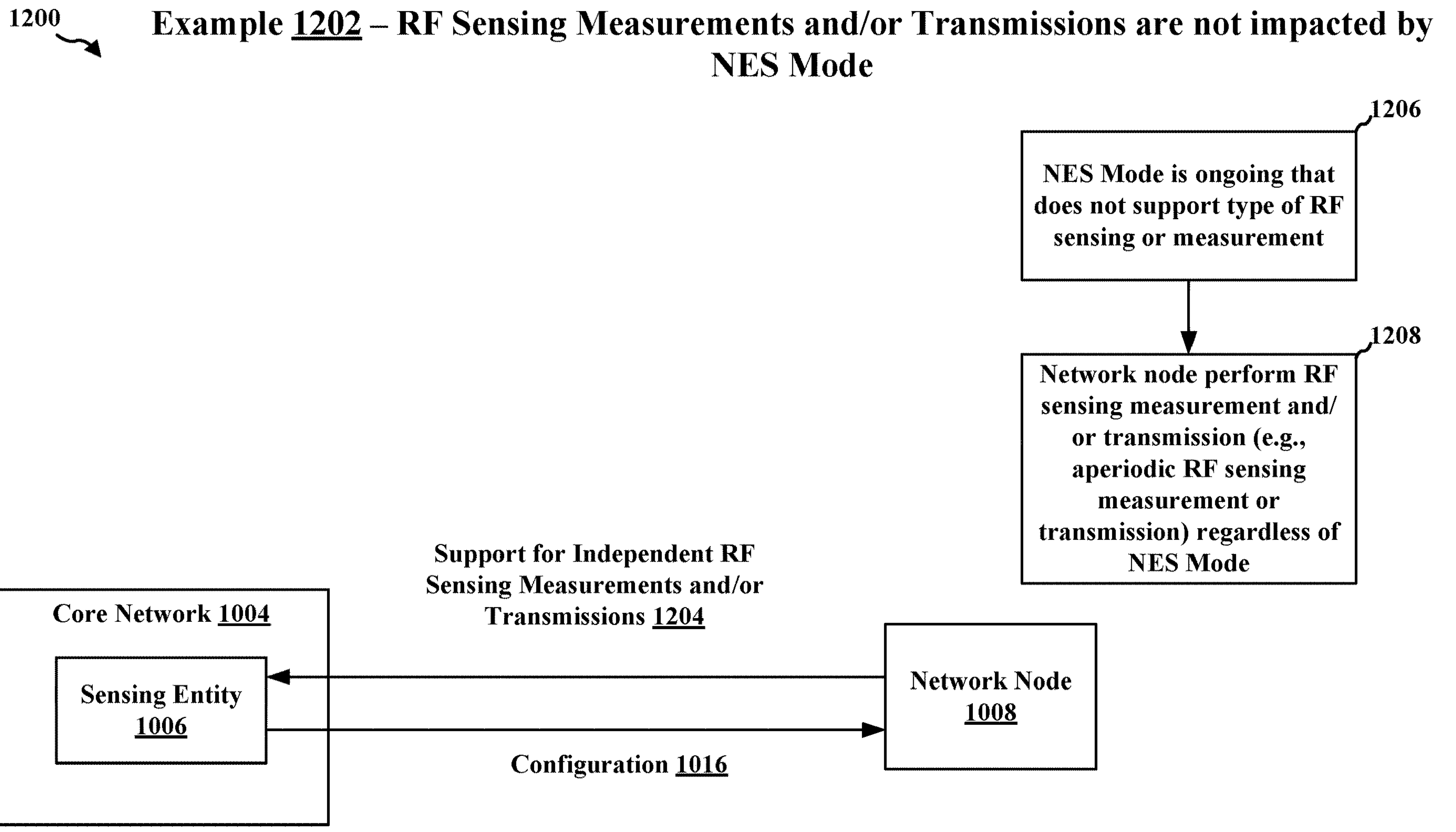
FIG. 12 is a diagram illustrating an example of RF sensing measurements and/or transmissions being performed independently of an NES mode.

FIG. 12 is a diagram 1200 illustrating an example of RF sensing measurements and/or transmissions being performed independently of an NES mode. In one aspect, a configuration for RF sensing measurements and/or transmissions may indicate that certain RF sensing measurements and/or transmissions are to be performed regardless of an NES mode (i.e., certain RF sensing measurements and/or transmissions are not impacted by NES modes). In such an aspect, a TRP may perform RF sensing measurements and/or transmissions regardless of an ongoing NES mode. This may apply to semi-statically configured or dynamic NES modes. Such an aspect may be based on whether or not a network node (e.g., a gNB) supports performing RF sensing measurements and/or transmissions regardless of an ongoing NES mode. The network node may indicate such support to a sensing entity. In one aspect, whether an NES mode impacts an RF sensing measurement and/or transmission may be based on a type of RF sensing measurement and/or transmission. In an example, aperiodic RF sensing measurements and/or transmissions may not be impacted by an NES mode (i.e., aperiodic RF sensing measurements and/or transmissions may be carried out (i.e., performed) regardless of the NES mode) and periodic and semi-persistent RF sensing measurements and/or transmissions may be impacted by the NES mode (i.e., periodic and semi-persistent RF sensing measurements and/or transmissions may not be carried out (i.e., performed) if the NES mode does not support the periodic and semi-persistent RF sensing measurements and/or transmissions).

In an example 1202, the network node 1008 may transmit an indication of support for independent RF sensing measurements and/or transmissions 1204, where the indication indicates that the network node 1008 supports performing RF sensing measurements and/or transmissions regardless of an ongoing NES mode. The sensing entity 1006 may receive the indication of support for independent RF sensing measurements and/or transmissions 1204 and the sensing entity may generate the configuration 1016 based on the indication of support for independent RF sensing measurements and/or transmissions 1204. The sensing entity 1006 may transmit the configuration 1016 for the network node 1008 and/or the UE 1014 (not depicted in FIG. 12).

At 1206, the network node 1008 may be operating in an NES mode based on the configuration 1016, where the NES mode does not support a type of RF sensing or measurement. At 1208, the network node 1008 may perform an RF sensing measurement and/or transmission even though the NES mode does not support the RF sensing measurement and/or transmission.

Figure 13:
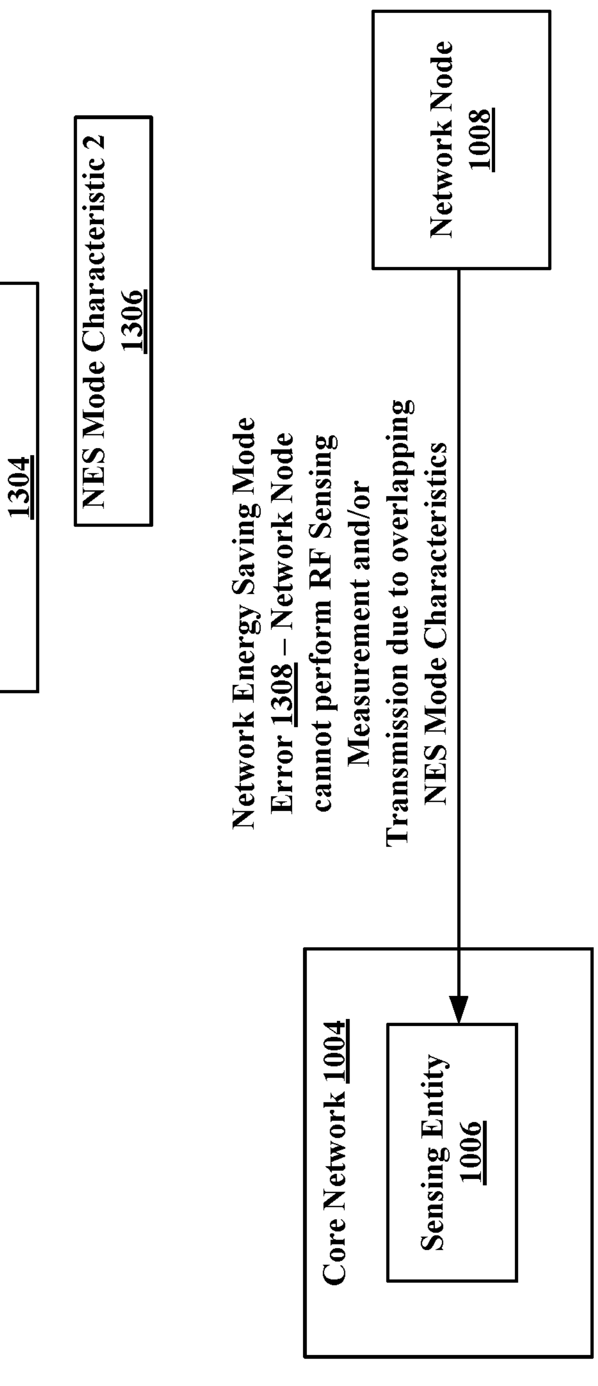
FIG. 13 is a diagram illustrating example aspects of overlapping NES mode characteristics.

FIG. 13 is a diagram 1300 illustrating example aspects of overlapping NES mode characteristics. For dynamic NES mode changes, a sensing entity may not be signaled with dynamic changes of an operating NES mode by a network node and/or a UE. At the same time, a sensing mode may configure certain TRPs to perform RF sensing measurements, which may sometimes not be able to be performed due to an NES mode characteristic. In such an instance, an error reason may be provided to a sensing entity.

In an example 1302, the network node 1008 may be operating in an NES mode associated with a first NES mode characteristic 1304 and a second NES mode characteristic 1306. The first NES mode characteristic 1304 and the second NES mode characteristic 1306 may overlap with respect to a particular type of RF sensing measurement and/or transmission, that is, the first NES mode characteristic 1304 and the second NES mode characteristic 1306 may be incompatible with one another with respect to the particular type of RF sensing measurement and/or transmission. The network node 1008 may attempt to perform the particular type of RF sensing measurement and/or transmission. The network node 1008 may generate a network energy saving mode error 1308 that indicates that the network node 1008 is unable to perform the particular RF sensing measurement and/or transmission due to overlapping NES mode characteristics (i.e., due to the first NES mode characteristic 1304 overlapping with the second NES mode characteristic 1306). The network node 1008 may transmit the network energy saving mode error 1308 to the sensing entity 1006.

Figure 14:
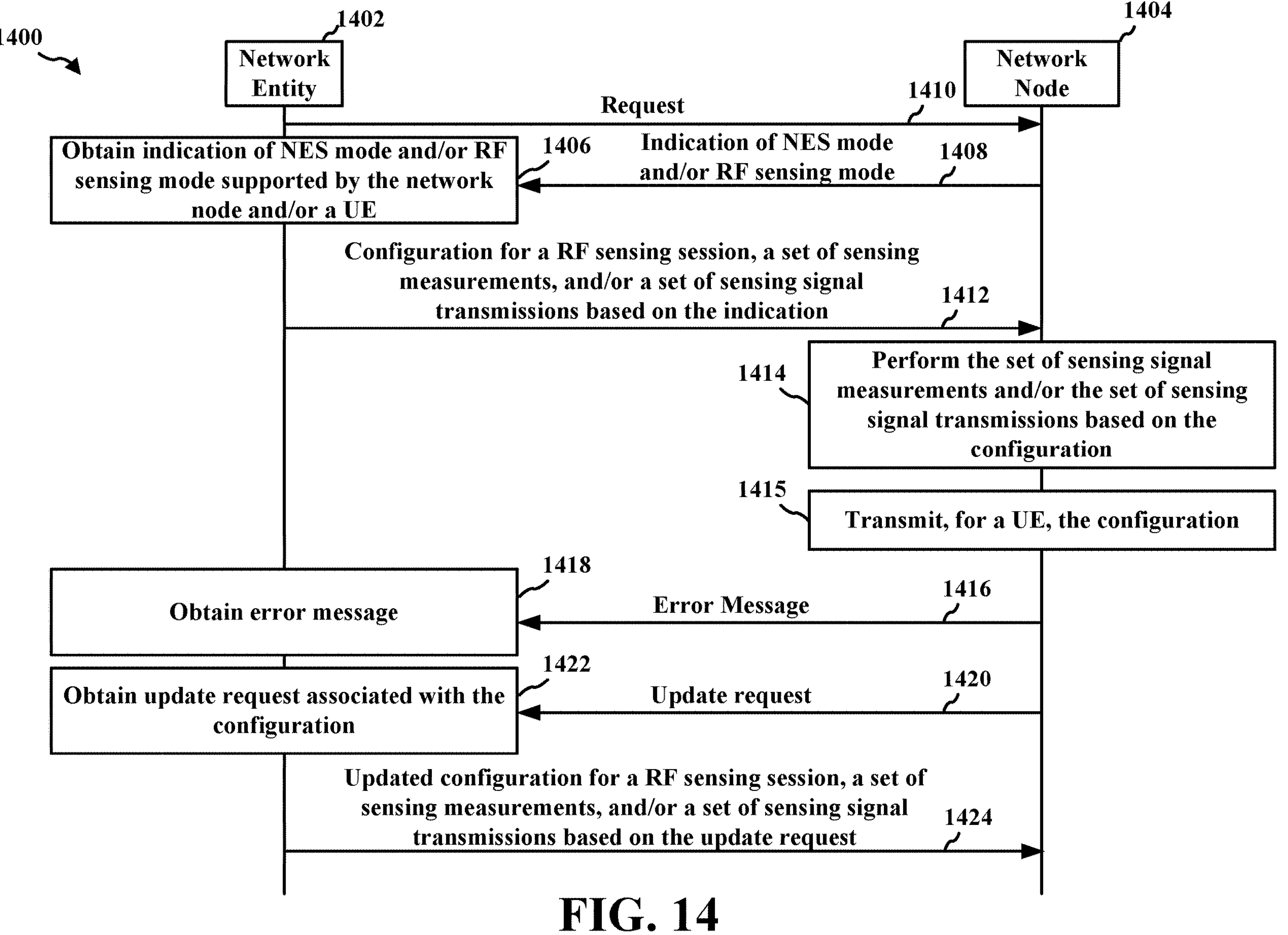
FIG. 14 is a diagram illustrating an example communication flow diagram between a network entity and a network node.

FIG. 14 is a diagram 1400 illustrating example communications between a network entity 1402 and a network node 1404. In an example, the network entity 1402 may be the sensing entity 1006. In an example, the network node 1404 may be the network node 1008.

At 1406, the network entity 1402 may obtain an indication of an NES mode and/or an RF sensing mode supported by the network node 1404 and/or a UE. For instance, in one aspect, at 1408 the network entity 1402 may receive the indication of the NES mode and/or the RF sensing mode from the network node 1404, where the indication is transmitted by the network node 1404. In another aspect, at 1410, the network entity 1402 may transmit a request for the indication of the NES mode and/or the RF sensing mode. In such an aspect, the network node 1404 may transmit the indication of the NES mode and/or the RF sensing mode based on receiving the request. At 1412, the network entity 1402 may transmit a configuration for an RF sensing session, a set of sensing measurements, and/or a set of sensing signal transmissions based on the indication obtained at 1406. At 1414, the network node 1404 may perform the set of sensing signal measurements and/or the set of sensing signal transmissions based on the configuration. In one aspect, the set of sensing signal measurements and/or the set of sensing signal transmissions may be performed by the network node 1404 during the RF sensing session, where the RF sensing session is performed based on the configuration. At 1415, the network node 1404 may transmit, for the UE, the configuration for the RF sensing session, the set of sensing measurements, and/or the set of sensing signal transmissions. In one aspect, the UE may perform the set of sensing signal measurements and/or the set of sensing signal transmissions based on the configuration. In one aspect, the set of sensing signal measurements and/or the set of sensing signal transmissions may be performed by the UE during the RF sensing session, where the RF sensing session is performed based on the configuration. The UE may transmit the set of sensing signal measurements and/or the set of sensing signal transmissions to the network node 1404 and the network node 1404 may receive the set of sensing signal measurements and/or the set of sensing signal transmissions.

In one aspect, the network node 1404 may be unable to perform the set of sensing signal measurements and/or the set of sensing signal transmissions due to overlapping NES mode characteristics. In such an aspect, at 1416, the network node 1404 may transmit an error message for the network entity 1402 indicating that the network node 1404 is unable to perform the set of sensing signal measurements and/or the set of sensing signal transmissions due to the overlapping NES mode characteristics. At 1418, the network entity 1402 may obtain the error message.

In one aspect, at 1420, the network node 1404 may transmit an update request associated with the configuration to the network entity 1402. At 1422, the network entity 1402 may obtain the update request. At 1424, the network entity 1402 may transmit, based on the update request, an updated configuration for an RF sensing session, a set of sensing measurements, and/or a set of sensing signal transmissions.

Figure 15:
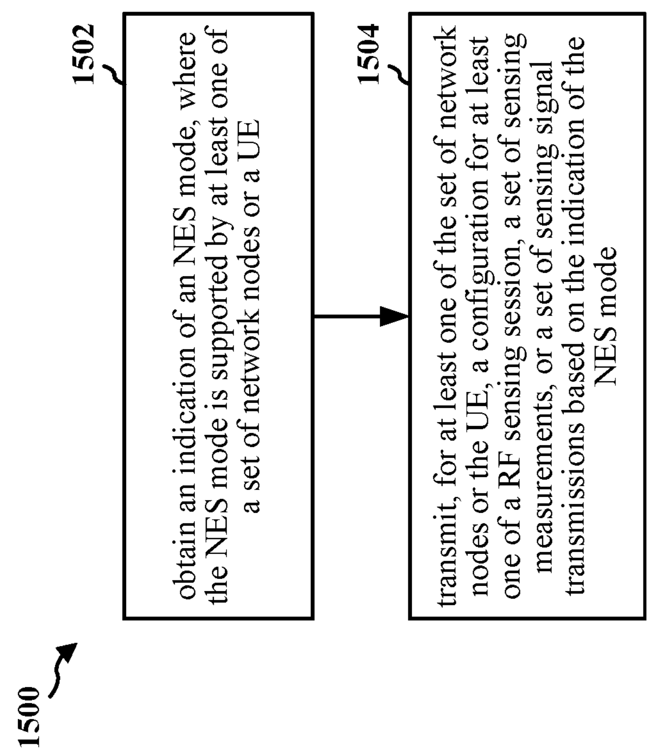
FIG. 15 is a flowchart of a method of wireless communication.

FIG. 15 is a flowchart 1500 of a method of wireless communication. The method may be performed by a network entity (e.g., the core network 120, the core network 1004, the sensing entity 1006, the network entity 1402, the network entity 2160). The method may be associated with reduced power consumption in a network. In an example, the method may be performed by the NES mode component 198.

At 1502, the network entity obtains an indication of an NES mode, where the NES mode is supported by at least one of a set of network nodes or a UE. For example, FIG. 14 at 1406 shows that the network entity 1402 may obtain an indication of an NES mode supported by the network node 1404 and/or a UE. In an example, the NES mode may include aspects described above in connection with FIGS. 7-9. In another example, the indication of the NES mode may include the indication of the supported NES mode 1010. In an example, the set of network nodes may be or include the network node 1008 and the UE may be or include the UE 1014. In an example, 1502 may be performed by the NES mode component 198.

At 1504, the network entity transmits, for at least one of the set of network nodes or the UE, a configuration for at least one of an RF sensing session, a set of sensing measurements, or a set of sensing signal transmissions based on the indication of the NES mode. For example, FIG. 14 at 1412 shows that the network entity 1402 may transmit, for the network node 1404 or a UE, a configuration for an RF sensing session, a set of sensing measurements, and/or a set of sensing signal transmissions based on the indication obtained at 1406. In an example, the configuration may be or include the configuration 1016. In an example, RF sensing measurements may be or include a range map, an angle map, and/or a point cloud. In an example, a sensing signal transmission in the set of sensing signal transmissions may be similar to a SRS for positioning, where the SRS is a signal transmitted by a UE for positioning purposes. In an example, 1504 may be performed by the NES mode component 198.

Figure 16:
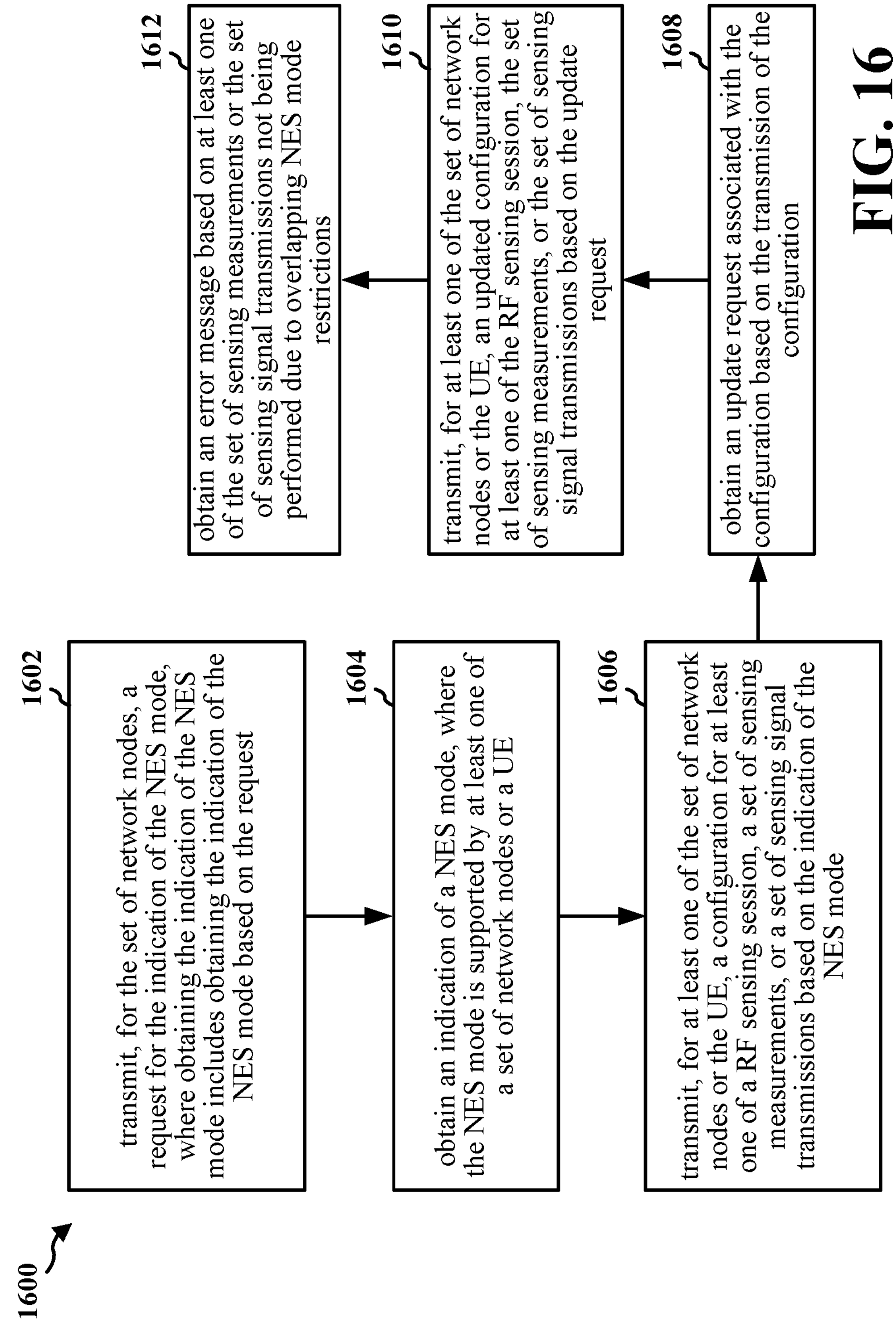
FIG. 16 is a flowchart of a method of wireless communication.

FIG. 16 is a flowchart 1600 of a method of wireless communication. The method may be performed by a network entity (e.g., the core network 120, the core network 1004, the sensing entity 1006, the network entity 1402, the network entity 2160). The method may be associated with reduced power consumption in a network. In an example, the method (including the various aspects detailed below) may be performed by the NES mode component 198.

At 1604, the network entity obtains an indication of an NES mode, where the NES mode is supported by at least one of a set of network nodes or a UE. For example, FIG. 14 at 1406 shows that the network entity 1402 may obtain an indication of an NES mode supported by the network node 1404 and/or a UE. In an example, the NES mode may include aspects described above in connection with FIGS. 7-9. In another example, the indication of the NES mode may include the indication of the supported NES mode 1010. In an example, the set of network nodes may be or include the network node 1008 and the UE may be or include the UE 1014. In an example, 1604 may be performed by the NES mode component 198.

At 1606, the network entity transmits, for at least one of the set of network nodes or the UE, a configuration for at least one of an RF sensing session, a set of sensing measurements, or a set of sensing signal transmissions based on the indication of the NES mode. For example, FIG. 14 at 1412 shows that the network entity 1402 may transmit, for the network node 1404 or a UE, a configuration for an RF sensing session, a set of sensing measurements, and/or a set of sensing signal transmissions based on the indication obtained at 1406. In an example, the configuration may be or include the configuration 1016. In an example, 1606 may be performed by the NES mode component 198.

In one aspect, obtaining the indication of the NES mode may include receiving the indication from at least one of: one or more network nodes in the set of network nodes or a second network entity. For example, FIG. 14 at 1408 shows that the network entity 1402 may receive the indication from the network node 1404. In another example, the first example 1002 of FIG. 10 shows that the sensing entity 1006 may receive an indication of a supported NES mode 1010 from the network node 1008. In yet another example, the second example 1018 shows that the network entity may receive the indication of the supported NES mode 1010 from the LMF 1020 (i.e., a second network entity).

In one aspect, at 1602, the network entity may transmit, for the set of network nodes, a request for the indication of the NES mode, where obtaining the indication of the NES mode may include obtaining the indication of the NES mode based on the request. For example, FIG. 14 at 1410 shows that the network entity 1402 may transmit a request for the indication of the NES mode to the network node 1404. Furthermore, obtaining the indication at 1406 may be based on the request transmitted at 1410. In an example, 1602 may be performed by the NES mode component 198.

In one aspect, the NES mode may be associated with at least one of a number of antenna ports, a type of sleep mode, a cell DTX, an UL state, or a DL state utilized for at least one of the RF sensing session, the set of sensing measurements, or the set of sensing signal transmissions. An UL state may refer to a state in which a network is performing UL related operations (and not DL related operations). A DL state may refer to a state in which a network is performing DL related operations (and not UL related operations). For example, the aforementioned aspect may be associated with aspects described above in connection with FIGS. 7-9.

In one aspect, at 1608, the network entity may obtain an update request associated with the configuration based on the transmission of the configuration. For example, FIG. 14 at 1422 shows that the network entity 1402 may obtain an update request associated with the configuration based on the transmission of the configuration transmitted at 1412. In an example, 1608 may be performed by the NES mode component 198.

In one aspect, at 1610, the network entity may transmit, for at least one of the set of network nodes or the UE, an updated configuration for at least one of the RF sensing session, the set of sensing measurements, or the set of sensing signal transmissions based on the update request. For example, FIG. 14 at 1424 shows that the network entity 1402 may transmit, for the network node 1404 or a UE, an updated configuration for an RF sensing session, a set of sensing measurements, and/or a set of sensing signal transmissions. In an example, 1610 may be performed by the NES mode component 198.

In one aspect, the configuration may indicate one or more types of NES modes supported for each sensing measurement in the set of sensing measurements or for each sensing signal transmission in the set of sensing signal transmissions. For example, the configuration 1016 may indicate one or more types of NES modes supported for each sensing measurement in the set of sensing measurements or for each sensing signal transmission in the set of sensing signal transmissions. The aforementioned aspect may correspond to aspects described above in connection with FIG. 11.

In one aspect, the configuration may indicate that at least one of the set of network nodes or the UE is to perform at least one of the set of sensing measurements or the set of sensing signal transmissions independent of the NES mode supporting at least one of the set of sensing measurements or the set of sensing signal transmissions. For example, the aforementioned aspect may correspond to the example 1202 in FIG. 12.

In one aspect, the indication of the NES mode may indicate that the set of network nodes supports performance of at least one of the set of sensing measurements or the set of sensing signal transmissions independent of the NES mode supporting at least one of the set of sensing measurements or the set of sensing signal transmissions. For example, the aforementioned aspect may correspond to the example 1202 in FIG. 12.

In one aspect, the configuration may indicate one or more of: at least one of the set of network nodes or the UE is to perform at least one of aperiodic sensing measurements or aperiodic sensing signal transmissions independent of the NES mode supporting at least one of the aperiodic sensing measurements or the aperiodic sensing signal transmissions, or at least one of the set of network nodes or the UE is to perform at least one of periodic sensing measurements (i.e. periodic sensing), semi-persistent sensing measurements (i.e., semi-persistent sensing), periodic sensing signal transmissions, or semi-persistent sensing signal transmissions based on the NES mode supporting at least one of the periodic sensing measurements, the semi-persistent sensing measurements, the periodic sensing signal transmissions, or the semi-persistent sensing signal transmissions. For example, the aforementioned aspect may correspond to the example 1202 in FIG. 12.

In one aspect, the NES mode may be a semi-statically configured NES mode or a dynamically configured NES mode. For example, the NES mode in FIG. 14 may be a semi-statically configured NES mode or a dynamically configured NES mode. A semi-statically configured NES mode may refer to a configuration of an NES mode that is known a priori and that does not change dynamically. A semi-statically configured NES mode may be similar to a TDD semi-static configuration. A semi-statically configured NES mode may be updated with via RRC signaling and/or system information signaling. A dynamically configured NES mode may refer to a configuration of an NES mode that may be changed with dynamic signaling, such as DCI or a MAC control element (MAC-CE).

In one aspect, at 1612, the network entity may obtain an error message based on at least one of the set of sensing measurements or the set of sensing signal transmissions not being performed due to overlapping NES mode restrictions. For example, FIG. 14 at 1418 shows that the network entity 1402 may obtain an error message based on at least one of the set of sensing measurements or the set of sensing signal transmissions not being performed due to overlapping NES mode restrictions. In an example, the aforementioned aspect may correspond to aspects described above in connection with FIG. 13. Overlapping NES mode restrictions may refer to an RF sensing measurement and/or an RF sensing transmission that overlaps in time with a NES mode window. In an example, if an RF sensing transmission is configured at slot number 10, and a NES mode (e.g., NES mode 1) is configured from slot 8 to slot 12, the RF sensing transmission may overlap with NES mode 1. In an example, 1612 may be performed by the NES mode component 198.

Figure 17:
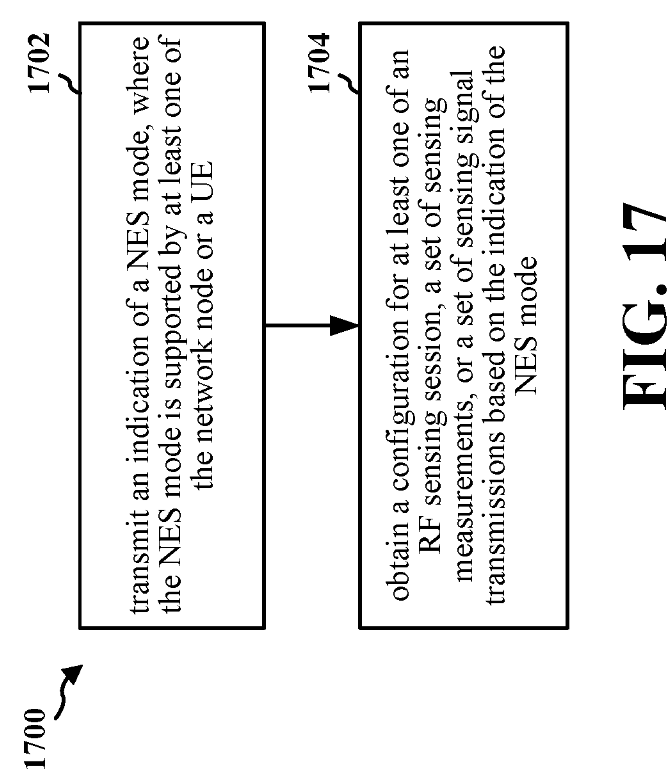
FIG. 17 is a flowchart of a method of wireless communication.

FIG. 17 is a flowchart 1700 of a method of wireless communication. The method may be performed by a network node (e.g., the base station 102, the base station 310, the TRP 402, the first TRP 504, the second TRP 506, the third TRP 508, the fourth TRP 510, the serving base station 604, the candidate neighbor BSs/TRPs 608, the network node 1008, the network node 1404, the network entity 2002, the CU 2010, the DU 2030, the RU 2040). In an example, the method may be performed by the NES mode component 199.

At 1702, the network node transmits an indication of an NES mode, where the NES mode is supported by at least one of the network node or a UE. For example, FIG. 14 at 1408 shows that the network node 1404 may transmit an indication of an NES mode supported by the network node 1404 and/or a UE. In an example, the NES mode may include aspects described above in connection with FIGS. 7-9. In another example, the indication of the NES mode may include the indication of the supported NES mode 1010. In an example, the UE may be or include the UE 1014. In an example, 1702 may be performed by the NES mode component 199.

At 1704, the network node obtains a configuration for at least one of an RF sensing session, a set of sensing measurements, or a set of sensing signal transmissions based on the indication of the NES mode. For example, FIG. 14 at 1412 shows that the network node 1404 may obtain a configuration for an RF sensing session, a set of sensing measurements, and/or a set of sensing signal transmissions based on the indication transmitted at 1408. In an example, the configuration may be or include the configuration 1016. In an example, 1704 may be performed by the NES mode component 199.

Figure 18:
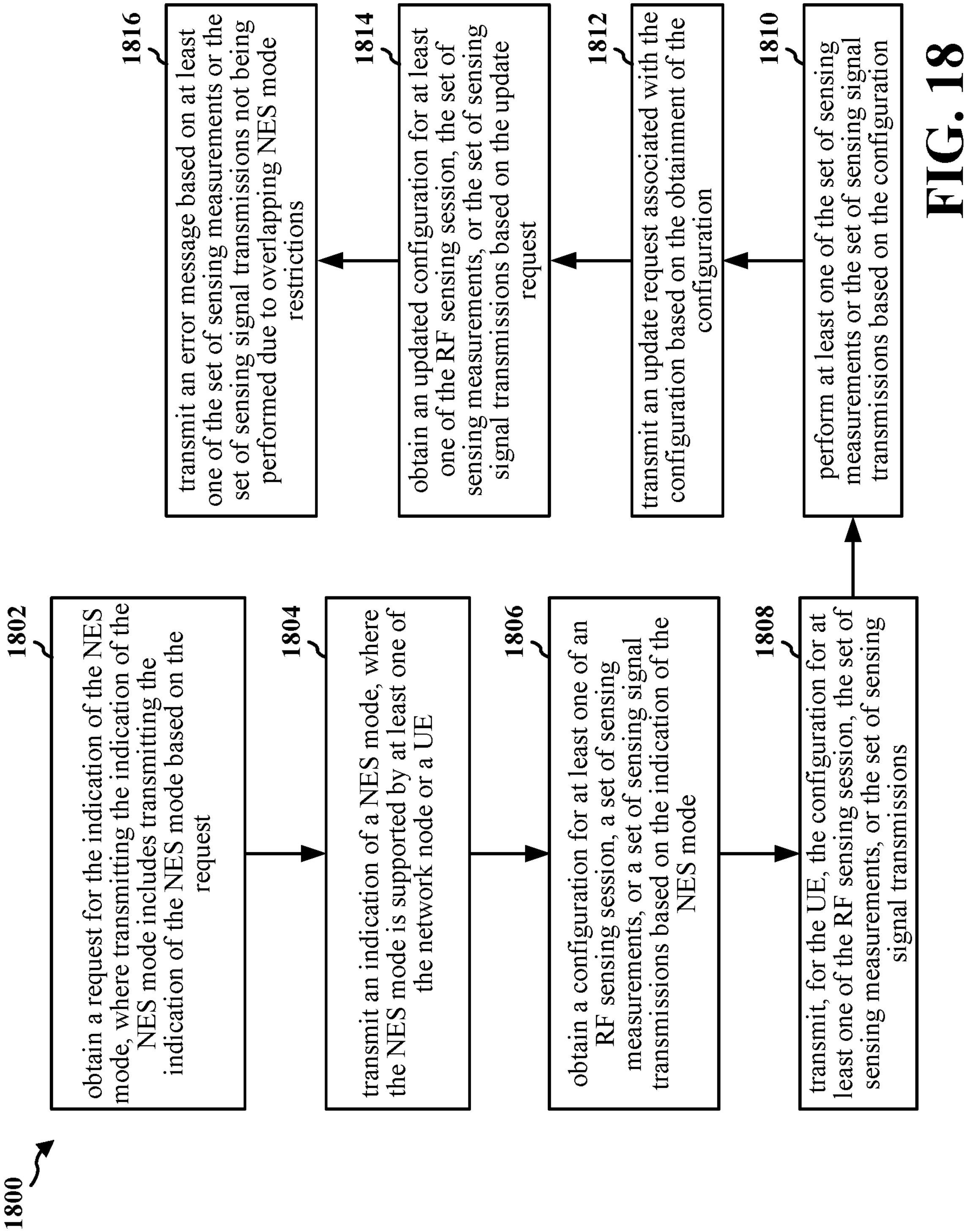
FIG. 18 is a flowchart of a method of wireless communication.

FIG. 18 is a flowchart 1800 of a method of wireless communication. The method may be performed by a network node (e.g., the base station 102, the base station 310, the TRP 402, the first TRP 504, the second TRP 506, the third TRP 508, the fourth TRP 510, the serving base station 604, the candidate neighbor BSs/TRPs 608, the network node 1008, the network node 1404, the network entity 2002, the CU 2010, the DU 2030, the RU 2040). In an example, the method (including the various aspects detailed below) may be performed by the NES mode component 199.

At 1804, the network node transmits an indication of an NES mode, where the NES mode is supported by at least one of the network node or a UE. For example, FIG. 14 at 1408 shows that the network node 1404 may transmit an indication of an NES mode supported by the network node 1404 and/or a UE. In an example, the NES mode may include aspects described above in connection with FIGS. 7-9. In another example, the indication of the NES mode may include the indication of the supported NES mode 1010. In an example, the UE may be or include the UE 1014. In an example, 1804 may be performed by the NES mode component 198.

At 1806, the network node obtains a configuration for at least one of an RF sensing session, a set of sensing measurements, or a set of sensing signal transmissions based on the indication of the NES mode. For example, FIG. 14 at 1412 shows that the network node 1404 may obtain a configuration for an RF sensing session, a set of sensing measurements, and/or a set of sensing signal transmissions based on the indication transmitted at 1408. In an example, the configuration may be or include the configuration 1016. In an example, 1806 may be performed by the NES mode component 199.

In one aspect, obtaining the configuration may include receiving the configuration from at least one of the UE or a network entity. For example, FIG. 14 at 1412 shows that the network node 1404 may receive the configuration from the network entity 1402. In another example, the network node 1404 may receive the configuration from a UE (e.g., the UE 1014).

In one aspect, at 1802, the network node may obtain a request for the indication of the NES mode, where transmitting the indication of the NES mode may include transmitting the indication of the NES mode based on the request. For example, FIG. 14 at 1410 shows that the network node 1404 may receive a request for the indication of the NES mode from the network node 1404. Furthermore, transmitting the indication at 1408 may be based on the request obtained at 1410. In an example, 1802 may be performed by the NES mode component 199.

In one aspect, the NES mode may be associated with at least one of a number of antenna ports, a type of sleep mode, a cell DTX, an UL state, or a DL state utilized for at least one of the RF sensing session, the set of sensing measurements, or the set of sensing signal transmissions. For example, the aforementioned aspect may be associated with aspects described above in connection with FIGS. 7-9.

In one aspect, at 1812, the network node may transmit an update request associated with the configuration based on the obtainment of the configuration. For example, FIG. 14 at 1420 shows that the network node 1404 may transmit an update request associated with the configuration based on obtaining the configuration at 1412. In an example, 1812 may be performed by the NES mode component 199.

In one aspect, at 1814, the network node may obtain an updated configuration for at least one of the RF sensing session, the set of sensing measurements, or the set of sensing signal transmissions based on the update request. For example, FIG. 14 at 1424 shows that the network node 1404 may obtain an updated configuration for an RF sensing session, a set of sensing measurements, and/or a set of sensing signal transmissions. In an example, 1814 may be performed by the NES mode component 199.

In one aspect, the configuration may indicate one or more types of NES modes supported for each sensing measurement in the set of sensing measurements or for each sensing signal transmission in the set of sensing signal transmissions. For example, the configuration 1016 may indicate one or more types of NES modes supported for each sensing measurement in the set of sensing measurements or for each sensing signal transmission in the set of sensing signal transmissions. The aforementioned aspect may correspond to aspects described above in connection with FIG. 11.

In one aspect, the configuration may indicate that at least one of the network node or the UE is to perform at least one of the set of sensing measurements or the set of sensing signal transmissions independent of the NES mode supporting at least one of the set of sensing measurements or the set of sensing signal transmissions. For example, the aforementioned aspect may correspond to the example 1202 in FIG. 12.

In one aspect, the indication of the NES mode may indicate that the network node supports performance of at least one of the set of sensing measurements or the set of sensing signal transmissions independent of the NES mode supporting at least one of the set of sensing measurements or the set of sensing signal transmissions. For example, the aforementioned aspect may correspond to the example 1202 in FIG. 12.

In one aspect, the configuration may indicate one or more of: at least one of the network node or the UE is to perform at least one of aperiodic sensing measurements or aperiodic sensing signal transmissions independent of the NES mode supporting at least one of the aperiodic sensing measurements or the aperiodic sensing signal transmissions, or at least one of the network node or the UE is to perform at least one of periodic sensing measurements, semi-persistent sensing measurements, periodic sensing signal transmissions, or semi-persistent sensing signal transmissions based on the NES mode supporting at least one of the periodic sensing measurements, the semi-persistent sensing measurements, the periodic sensing signal transmissions, or the semi-persistent sensing signal transmissions. For example, the aforementioned aspect may correspond to the example 1202 in FIG. 12.

In one aspect, the NES mode may be a semi-statically configured NES mode or a dynamically configured NES mode. For example, the NES mode in FIG. 14 may be a semi-statically configured NES mode or a dynamically configured NES mode.

In one aspect, at 1816, the network node may transmit an error message based on at least one of the set of sensing measurements or the set of sensing signal transmissions not being performed due to overlapping NES mode restrictions. For example, FIG. 14 at 1416 shows that the network node 1404 may transmit an error message based on at least one of the set of sensing measurements or the set of sensing signal transmissions not being performed due to overlapping NES mode restrictions. In an example, the aforementioned aspect may correspond to aspects described above in connection with FIG. 13. In an example, 1816 may be performed by the NES mode component 199.

In one aspect, at 1808, the network node may transmit, for the UE, the configuration for at least one of the RF sensing session, the set of sensing measurements, or the set of sensing signal transmissions. For example, FIG. 14 at 1415 shows that the network node 1404 may transmit, for a UE, the configuration for at least one of the RF sensing session, the set of sensing measurements, or the set of sensing signal transmissions. In an example, 1808 may be performed by the NES mode component 199.

In one aspect, at 1810, the network node may perform at least one of the set of sensing measurements or the set of sensing signal transmissions based on the configuration. For example, FIG. 14 at 1414 shows that the network node 1404 may perform the set of sensing signal measurements and/or the set of sensing signal transmissions based on the configuration obtained at 1412. In an example, 1810 may be performed by the NES mode component 199.

Figure 19:
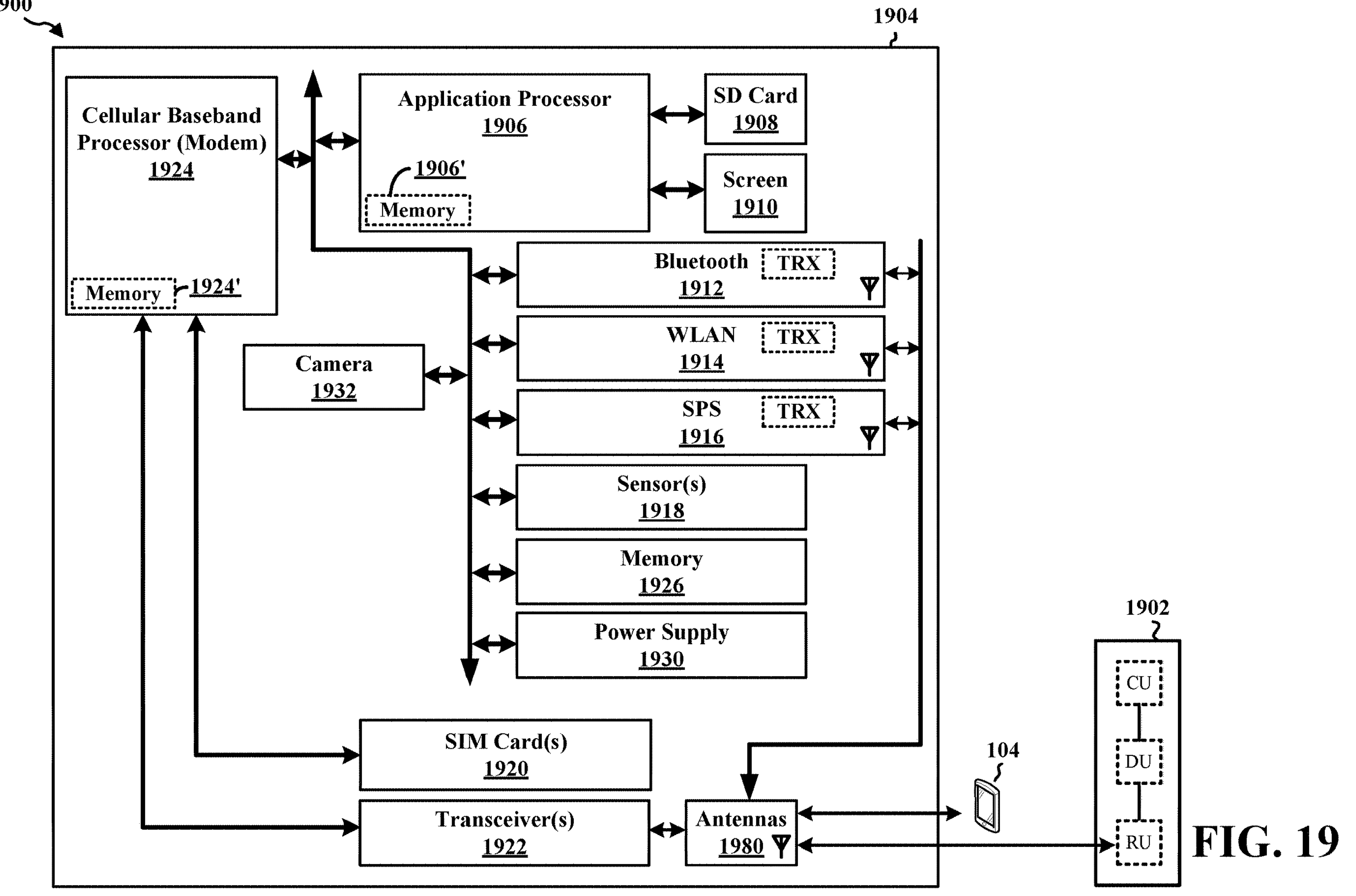
FIG. 19 is a diagram illustrating an example of a hardware implementation for an example apparatus and/or network entity.

FIG. 19 is a diagram 1900 illustrating an example of a hardware implementation for an apparatus 1904. The apparatus 1904 may be a UE, a component of a UE, or may implement UE functionality. In some aspects, the apparatus 1904 may include a cellular baseband processor 1924 (also referred to as a modem) coupled to one or more transceivers 1922 (e.g., cellular RF transceiver). The cellular baseband processor 1924 may include on-chip memory 1924'. In some aspects, the apparatus 1904 may further include one or more subscriber identity modules (SIM) cards 1920 and an application processor 1906 coupled to a secure digital (SD) card 1908 and a screen 1910. The application processor 1906 may include on-chip memory 1906'. In some aspects, the apparatus 1904 may further include a Bluetooth module 1912, a WLAN module 1914, an SPS module 1916 (e.g., GNSS module), one or more sensor modules 1918 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1926, a power supply 1930, and/or a camera 1932. The Bluetooth module 1912, the WLAN module 1914, and the SPS module 1916 may include an on-chip transceiver (TRX) (or in some cases, just a receiver (RX)). The Bluetooth module 1912, the WLAN module 1914, and the SPS module 1916 may include their own dedicated antennas and/or utilize the antennas 1980 for communication. The cellular baseband processor 1924 communicates through the transceiver(s) 1922 via one or more antennas 1980 with the UE 104 and/or with an RU associated with a network entity 1902. The cellular baseband processor 1924 and the application processor 1906 may each include a computer-readable medium/memory 1924', 1906', respectively. The additional memory modules 1926 may also be considered a computer-readable medium/memory. Each computer-readable medium/memory 1924', 1906', 1926 may be non-transitory. The cellular baseband processor 1924 and the application processor 1906 are each responsible for general processing, including the execution of software stored on the computer-readable medium/memory. The software, when executed by the cellular baseband processor 1924/application processor 1906, causes the cellular baseband processor 1924/application processor 1906 to perform the various functions described supra. The computer-readable medium/memory may also be used for storing data that is manipulated by the cellular baseband processor 1924/application processor 1906 when executing software. The cellular baseband processor 1924/application processor 1906 may be a component of the UE 350 and may include the memory 360 and/or at least one of the TX processor 368, the RX processor 356, and the controller/processor 359. In one configuration, the apparatus 1904 may be a processor chip (modem and/or application) and include just the cellular baseband processor 1924 and/or the application processor 1906, and in another configuration, the apparatus 1904 may be the entire UE (e.g., see UE 350 of FIG. 3) and include the additional modules of the apparatus 1904.

Figure 20:
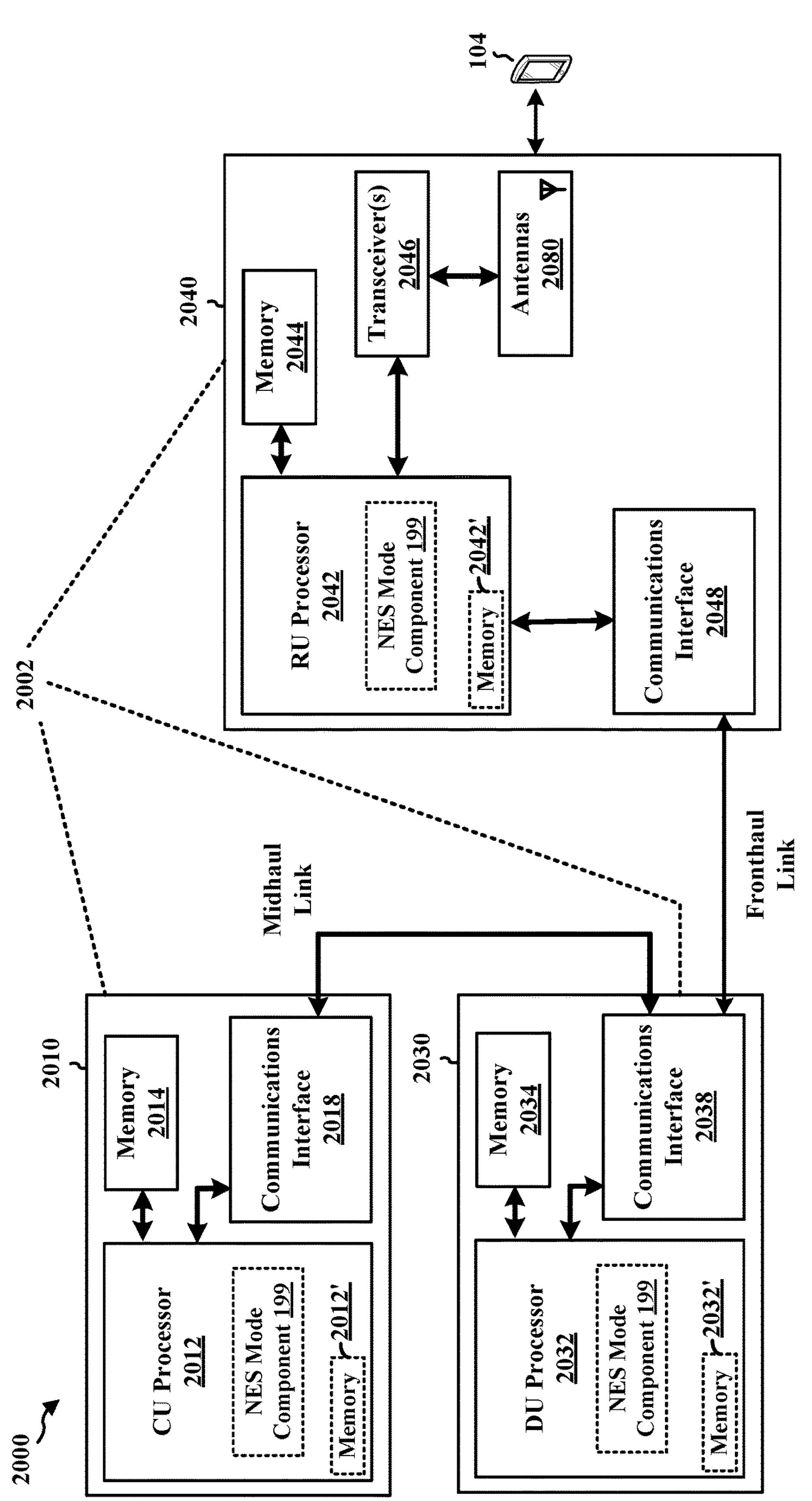
FIG. 20 is a diagram illustrating an example of a hardware implementation for an example network entity.

FIG. 20 is a diagram 2000 illustrating an example of a hardware implementation for a network entity 2002. The network entity 2002 may be a BS, a component of a BS, or may implement BS functionality. The network entity 2002 may include at least one of a CU 2010, a DU 2030, or an RU 2040. For example, depending on the layer functionality handled by the NES mode component 199, the network entity 2002 may include the CU 2010; both the CU 2010 and the DU 2030; each of the CU 2010, the DU 2030, and the RU 2040; the DU 2030; both the DU 2030 and the RU 2040; or the RU 2040. The CU 2010 may include a CU processor 2012. The CU processor 2012 may include on-chip memory 2012'. In some aspects, the CU 2010 may further include additional memory modules 2014 and a communications interface 2018. The CU 2010 communicates with the DU 2030 through a midhaul link, such as an F1 interface. The DU 2030 may include a DU processor 2032. The DU processor 2032 may include on-chip memory 2032'. In some aspects, the DU 2030 may further include additional memory modules 2034 and a communications interface 2038. The DU 2030 communicates with the RU 2040 through a fronthaul link. The RU 2040 may include an RU processor 2042. The RU processor 2042 may include on-chip memory 2042'. In some aspects, the RU 2040 may further include additional memory modules 2044, one or more transceivers 2046, antennas 2080, and a communications interface 2048. The RU 2040 communicates with the UE 104. The on-chip memory 2012', 2032', 2042' and the additional memory modules 2014, 2034, 2044 may each be considered a computer-readable medium/memory. Each computer-readable medium/memory may be non-transitory. Each of the processors 2012, 2032, 2042 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the NES mode component 199 may be configured to transmit an indication of an NES mode, where the NES mode is supported by at least one of the network node or a UE. The NES mode component 199 may be configured to obtain a configuration for at least one of an RF sensing session, a set of sensing measurements, or a set of sensing signal transmissions based on the indication of the NES mode. The NES mode component 199 may be configured to obtain a request for the indication of the NES mode, where transmitting the indication of the NES mode includes transmitting the indication of the NES mode based on the request. The NES mode component 199 may be configured to transmit an update request associated with the configuration based on the obtainment of the configuration. The NES mode component 199 may be configured to obtain an updated configuration for at least one of the RF sensing session, the set of sensing measurements, or the set of sensing signal transmissions based on the update request. The NES mode component 199 may be configured to transmit an error message based on at least one of the set of sensing measurements or the set of sensing signal transmissions not being performed due to overlapping NES mode restrictions. The NES mode component 199 may be configured to transmit, for the UE, the configuration for at least one of the RF sensing session, the set of sensing measurements, or the set of sensing signal transmissions. The NES mode component 199 may be configured to perform at least one of the set of sensing measurements or the set of sensing signal transmissions based on the configuration. The NES mode component 199 may be within one or more processors of one or more of the CU 2010, DU 2030, and the RU 2040. The NES mode component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 2002 may include a variety of components configured for various functions. In one configuration, the network entity 2002 may include means for transmitting an indication of at least one of a network energy saving (NES) mode or a radio frequency (RF) sensing mode, where the NES mode is supported by at least one of the network node or a user equipment (UE). In one configuration, the network entity 2002 may include means for obtaining a configuration for at least one of an RF sensing session, a set of sensing measurements, or a set of sensing signal transmissions based on the indication of the NES mode. In one configuration, the network entity 2002 may include means for obtaining a request for the indication of the NES mode, where transmitting the indication of the NES mode includes transmitting the indication of the NES mode based on the request. In one configuration, the network entity 2002 may include means for transmitting an update request associated with the configuration based on the obtainment of the configuration. In one configuration, the network entity 2002 may include means for obtaining an updated configuration for at least one of the RF sensing session, the set of sensing measurements, or the set of sensing signal transmissions based on the update request. In one configuration, the network entity 2002 may include means for transmitting an error message based on at least one of the set of sensing measurements or the set of sensing signal transmissions not being performed due to overlapping NES mode restrictions. In one configuration, the network entity 2002 may include means for transmitting, for the UE, the configuration for at least one of the RF sensing session, the set of sensing measurements, or the set of sensing signal transmissions. In one configuration, the network entity 2002 may include means for performing at least one of the set of sensing measurements or the set of sensing signal transmissions based on the configuration. The means may be the NES mode component 199 of the network entity 2002 configured to perform the functions recited by the means. As described supra, the network entity 2002 may include the TX processor 316, the RX processor 370, and the controller/processor 375. As such, in one configuration, the means may be the TX processor 316, the RX processor 370, and/or the controller/processor 375 configured to perform the functions recited by the means.

Figure 21:
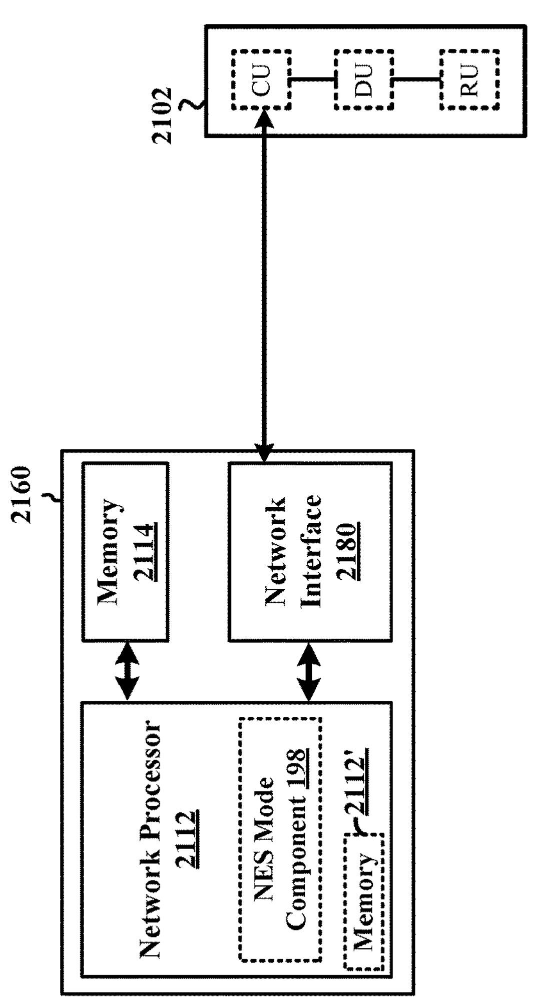
FIG. 21 is a diagram illustrating an example of a hardware implementation for an example network entity.

FIG. 21 is a diagram 2100 illustrating an example of a hardware implementation for a network entity 2160. In one example, the network entity 2160 may be within the core network 120. The network entity 2160 may include a network processor 2112. The network processor 2112 may include on-chip memory 2112'. In some aspects, the network entity 2160 may further include additional memory modules 2114. The network entity 2160 communicates via the network interface 2180 directly (e.g., backhaul link) or indirectly (e.g., through a RIC) with the CU 2102. The on-chip memory 2112' and the additional memory modules 2114 may each be considered a computer-readable medium/memory. Each computer-readable medium/memory may be non-transitory. The processor 2112 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the NES mode component 198 may be configured to obtain an indication of an NES mode, where the NES mode is supported by at least one of a set of network nodes or a UE. The NES mode component 198 may be configured to transmit, for at least one of the set of network nodes or the UE, a configuration for at least one of an RF sensing session, a set of sensing measurements, or a set of sensing signal transmissions based on the indication of the NES mode. The NES mode component 198 may be configured to transmit, for the set of network nodes, a request for the indication of the NES mode, where obtaining the indication of the NES mode includes obtaining the indication of the NES mode based on the request. The NES mode component 198 may be configured to obtain an update request associated with the configuration based on the transmission of the configuration. The NES mode component 198 may be configured to transmit, for at least one of the set of network nodes or the UE, an updated configuration for at least one of the RF sensing session, the set of sensing measurements, or the set of sensing signal transmissions based on the update request. The NES mode component 198 may be configured to obtain an error message based on at least one of the set of sensing measurements or the set of sensing signal transmissions not being performed due to overlapping NES mode restrictions. The NES mode component 198 may be within the processor 2112. The NES mode component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 2160 may include a variety of components configured for various functions. In one configuration, the network entity 2160 may include means for obtaining an indication of a network energy saving (NES) mode, where the NES mode is supported by at least one of a set of network nodes or a user equipment (UE). In one configuration, the network entity 2160 may include means for transmitting, for at least one of the set of network nodes or the UE, a configuration for at least one of an RF sensing session, a set of sensing measurements, or a set of sensing signal transmissions based on the indication of the NES mode. In one configuration, the network entity 2160 may include means for transmitting, for the set of network nodes, a request for the indication of the NES mode, where obtaining the indication of the NES mode includes obtaining the indication of the NES mode based on the request. In one configuration, the network entity 2160 may include means for obtaining an update request associated with the configuration based on the transmission of the configuration. In one configuration, the network entity 2160 may include means for transmitting, for at least one of the set of network nodes or the UE, an updated configuration for at least one of the RF sensing session, the set of sensing measurements, or the set of sensing signal transmissions based on the update request. In one configuration, the network entity 2160 may include means for obtaining an error message based on at least one of the set of sensing measurements or the set of sensing signal transmissions not being performed due to overlapping NES mode restrictions. The means may be the NES mode component 198 of the network entity 2160 configured to perform the functions recited by the means.

A network may implement a network energy saving (NES) mode in order to reduce energy/power consumption by UEs and/or network nodes in the network. For example, a network may reduce a number of antenna ports used by a UE for wireless communications in order to reduce power consumption of the UE. UEs and/or network nodes in a network may also be configured to perform RF sensing measurements and/or transmissions, where the RF sensing measurements and/or transmissions may be utilized for position, navigation, and timing purposes. In an example, the RF sensing measurements and/or transmissions may be utilized to ascertain a location of a UE. Some networks may not account for the impact of NES modes on RF sensing measurements and/or transmissions, and vice versa. For instance, some NES modes may not be compatible with some types of RF sensing measurements and/or transmissions.

Various technologies pertaining to network power saving and RF sensing are described herein. In an example, a network entity obtains an indication of an NES mode, where the NES mode is supported by at least one of a set of network nodes or a UE. The network entity transmits, for at least one of the set of network nodes or the UE, a configuration for at least one of an RF sensing session, a set of sensing measurements, or a set of sensing signal transmissions based on the indication of the NES mode. Vis-à-vis the above-described technologies, RF sensing measurements and/or transmissions may be performed in a manner that is consistent with NES modes. For instance, by transmitting the configuration for at least one of the RF sensing session, the set of sensing measurements, or the set of sensing signal transmissions, the network entity may enable benefits of RF sensing measurements and/or transmissions to be realized (e.g., UE location determination) while conserving power/energy in the network via an NES mode.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C. B and C. or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a network entity, comprising: obtaining an indication of a network energy saving (NES) mode, wherein the NES mode is supported by at least one of a set of network nodes or a user equipment (UE); and transmitting, for at least one of the set of network nodes or the UE, a configuration for at least one of an RF sensing session, a set of sensing measurements, or a set of sensing signal transmissions based on the indication of the NES mode.

Aspect 2 is the method of aspect 1, wherein obtaining the indication of the NES mode comprises receiving the indication from at least one of: one or more network nodes in the set of network nodes or a second network entity.

Aspect 3 is the method of any of aspects 1-2, further comprising: transmitting, for the set of network nodes, a request for the indication of the NES mode, wherein obtaining the indication of the NES mode comprises obtaining the indication of the NES mode based on the request.

Aspect 4 is the method of any of aspects 1-3, wherein the NES mode is associated with at least one of a number of antenna ports, a type of sleep mode, a cell discontinuous transmission (DTX), an uplink (UL) state, or a downlink (DL) state utilized for at least one of the RF sensing session, the set of sensing measurements, or the set of sensing signal transmissions.

Aspect 5 is the method of any of aspects 1-4, further comprising: obtaining an update request associated with the configuration based on the transmission of the configuration; and transmitting, for at least one of the set of network nodes or the UE, an updated configuration for at least one of the RF sensing session, the set of sensing measurements, or the set of sensing signal transmissions based on the update request.

Aspect 6 is the method of any of aspects 1-5, wherein the configuration indicates one or more types of NES modes supported for each sensing measurement in the set of sensing measurements or for each sensing signal transmission in the set of sensing signal transmissions.

Aspect 7 is the method of any of aspects 1-6, wherein the configuration indicates that at least one of the set of network nodes or the UE is to perform at least one of the set of sensing measurements or the set of sensing signal transmissions independent of the NES mode supporting at least one of the set of sensing measurements or the set of sensing signal transmissions.

Aspect 8 is the method of aspect 7, wherein the indication of the NES mode indicates that the set of network nodes supports performance of at least one of the set of sensing measurements or the set of sensing signal transmissions independent of the NES mode supporting at least one of the set of sensing measurements or the set of sensing signal transmissions.

Aspect 9 is the method of any of aspects 1-8, wherein the configuration indicates one or more of: at least one of the set of network nodes or the UE is to perform at least one of aperiodic sensing measurements or aperiodic sensing signal transmissions independent of the NES mode supporting at least one of the aperiodic sensing measurements or the aperiodic sensing signal transmissions, or at least one of the set of network nodes or the UE is to perform at least one of periodic sensing measurements, semi-persistent sensing measurements, periodic sensing signal transmissions, or semi-persistent sensing signal transmissions based on the NES mode supporting at least one of the periodic sensing measurements, the semi-persistent sensing measurements, the periodic sensing signal transmissions, or the semi-persistent sensing signal transmissions.

Aspect 10 is the method of aspect 9, wherein the NES mode is a semi-statically configured NES mode or a dynamically configured NES mode.

Aspect 11 is the method of any of aspects 1-10, further comprising: obtaining an error message based on at least one of the set of sensing measurements or the set of sensing signal transmissions not being performed due to overlapping NES mode restrictions.

Aspect 12 is an apparatus for wireless communication at a network entity comprising a memory and at least one processor coupled to the memory and based at least in part on information stored in the memory, the at least one processor is configured to perform a method in accordance with any of aspects 1-11.

Aspect 13 is an apparatus for wireless communications, comprising means for performing a method in accordance with any of aspects 1-11.

Aspect 14 is the apparatus of aspect 12 or 13 further comprising at least one of a transceiver or an antenna coupled to the at least one processor, wherein the at least one processor is configured to transmit the configuration via at least one of the transceiver or the antenna Aspect 15 is a computer-readable medium (e.g., a non-transitory computer-readable medium) comprising instructions that, when executed by at least one processor, cause the at least one processor to perform a method in accordance with any of aspects 1-11.

Aspect 16 is a method of wireless communication at a network node, comprising: transmitting an indication of a network energy saving (NES) mode, wherein the NES mode is supported by at least one of the network node or a user equipment (UE); and obtaining a configuration for at least one of an RF sensing session, a set of sensing measurements, or a set of sensing signal transmissions based on the indication of the NES mode.

Aspect 17 is the method of aspect 16, wherein obtaining the configuration comprises receiving the configuration from at least one of the UE or a network entity.

Aspect 18 is the method of any of aspects 16-17, further comprising: obtaining a request for the indication of the NES mode, wherein transmitting the indication of the NES mode comprises transmitting the indication of the NES mode based on the request.

Aspect 19 is the method of any of aspects 16-18, wherein the NES mode is associated with at least one of a number of antenna ports, a type of sleep mode, a cell discontinuous transmission (DTX), an uplink (UL) state, or a downlink (DL) state utilized for at least one of the RF sensing session, the set of sensing measurements, or the set of sensing signal transmissions.

Aspect 20 is the method of any of aspects 16-19, further comprising: transmitting an update request associated with the configuration based on the obtainment of the configuration; and obtaining an updated configuration for at least one of the RF sensing session, the set of sensing measurements, or the set of sensing signal transmissions based on the update request.

Aspect 21 is the method of any of aspects 16-20, wherein the configuration indicates one or more types of NES modes supported for each sensing measurement in the set of sensing measurements or for each sensing signal transmission in the set of sensing signal transmissions.

Aspect 22 is the method of any of aspects 16-21, wherein the configuration indicates that at least one of the network node or the UE is to perform at least one of the set of sensing measurements or the set of sensing signal transmissions independent of the NES mode supporting at least one of the set of sensing measurements or the set of sensing signal transmissions.

Aspect 23 is the method of aspect 22, wherein the indication of the NES mode indicates that the network node supports performance of at least one of the set of sensing measurements or the set of sensing signal transmissions independent of the NES mode supporting at least one of the set of sensing measurements or the set of sensing signal transmissions.

Aspect 24 is the method of any of aspects 16-23, wherein the configuration indicates one or more of: at least one of the network node or the UE is to perform at least one of aperiodic sensing measurements or aperiodic sensing signal transmissions independent of the NES mode supporting at least one of the aperiodic sensing measurements or the aperiodic sensing signal transmissions, or at least one of the network node or the UE is to perform at least one of periodic sensing measurements, semi-persistent sensing measurements, periodic sensing signal transmissions, or semi-persistent sensing signal transmissions based on the NES mode supporting at least one of the periodic sensing measurements, the semi-persistent sensing measurements, the periodic sensing signal transmissions, or the semi-persistent sensing signal transmissions.

Aspect 25 is the method of aspect 24, wherein the NES mode is a semi-statically configured NES mode or a dynamically configured NES mode.

Aspect 26 is the method of any of aspects 16-25, further comprising: transmitting an error message based on at least one of the set of sensing measurements or the set of sensing signal transmissions not being performed due to overlapping NES mode restrictions.

Aspect 27 is the method of any of aspects 16-26, further comprising: transmitting, for the UE, the configuration for at least one of the RF sensing session, the set of sensing measurements, or the set of sensing signal transmissions.

Aspect 28 is the method of any of aspects 16-25 or 27, further comprising: performing at least one of the set of sensing measurements or the set of sensing signal transmissions based on the configuration.

Aspect 29 is an apparatus for wireless communication at a network node comprising a memory and at least one processor coupled to the memory and based at least in part on information stored in the memory, the at least one processor is configured to perform a method in accordance with any of aspects 16-28.

Aspect 30 is an apparatus for wireless communications, comprising means for performing a method in accordance with any of aspects 16-28.

Aspect 31 is the apparatus of aspect 29 or 30 further comprising at least one of a transceiver or an antenna coupled to the at least one processor, wherein the at least one processor is configured to transmit the indication of the NES mode via at least one of the transceiver or the antenna.

Aspect 32 is a computer-readable medium (e.g., a non-transitory computer-readable medium) comprising instructions that, when executed by at least one processor, cause the at least one processor to perform a method in accordance with any of aspects 16-28.

What is claimed is:

1. An apparatus for wireless communication at a network entity, comprising:

a memory; and at least one processor coupled to the memory and, based at least in part on information stored in the memory, the at least one processor is configured to:

obtain an indication of a network energy saving (NES) mode, wherein the NES mode is supported by at least one of a set of network nodes or a user equipment (UE); and transmit, for at least one of the set of network nodes or the UE, a configuration for at least one of an RF sensing session, a set of sensing measurements, or a set of sensing signal transmissions based on the indication of the NES mode, wherein the configuration indicates one or more types of NES modes supported for each sensing measurement in the set of sensing measurements or for each sensing signal transmission in the set of sensing signal transmissions.

2. The apparatus of claim 1, wherein to obtain the indication of the NES mode, the at least one processor is configured to receive the indication of the NES mode from at least one of: one or more network nodes in the set of network nodes or a second network entity.

3. The apparatus of claim 1, wherein the at least one processor is further configured to:

transmit, for the set of network nodes, a request for the indication of the NES mode, wherein to obtain the indication of the NES mode, the at least one processor is configured to obtain the indication of the NES mode based on the request.

4. The apparatus of claim 1, wherein the NES mode is associated with at least one of a number of antenna ports, a type of sleep mode, a cell discontinuous transmission (DTX), an uplink (UL) state, or a downlink (DL) state utilized for at least one of the RF sensing session, the set of sensing measurements, or the set of sensing signal transmissions.

5. The apparatus of claim 1, wherein the at least one processor is further configured to:

obtain an update request associated with the configuration based on the transmission of the configuration; and transmit, for at least one of the set of network nodes or the UE, an updated configuration for at least one of the RF sensing session, the set of sensing measurements, or the set of sensing signal transmissions based on the update request.

6. The apparatus of claim 1, wherein the configuration indicates that at least one of the set of network nodes or the UE is to perform at least one of the set of sensing measurements or the set of sensing signal transmissions independent of the NES mode supporting at least one of the set of sensing measurements or the set of sensing signal transmissions.

7. The apparatus of claim 6, wherein the indication of the NES mode indicates that the set of network nodes supports performance of at least one of the set of sensing measurements or the set of sensing signal transmissions independent of the NES mode supporting at least one of the set of sensing measurements or the set of sensing signal transmissions.

8. The apparatus of claim 1, wherein the configuration indicates one or more of:

at least one of the set of network nodes or the UE is to perform at least one of aperiodic sensing measurements or aperiodic sensing signal transmissions independent of the NES mode supporting at least one of the aperiodic sensing measurements or the aperiodic sensing signal transmissions, or at least one of the set of network nodes or the UE is to perform at least one of periodic sensing measurements, semi-persistent sensing measurements, periodic sensing signal transmissions, or semi-persistent sensing signal transmissions based on the NES mode supporting at least one of the periodic sensing measurements, the semi-persistent sensing measurements, the periodic sensing signal transmissions, or the semi-persistent sensing signal transmissions.

9. The apparatus of claim 8, wherein the NES mode is a semi-statically configured NES mode or a dynamically configured NES mode.

10. The apparatus of claim 1, wherein the at least one processor is further configured to:

obtain an error message based on at least one of the set of sensing measurements or the set of sensing signal transmissions not being performed due to overlapping NES mode restrictions.

11. The apparatus of claim 1, further comprising at least one of a transceiver or an antenna coupled to the at least one processor, wherein to transmit the configuration, the at least one processor is configured to transmit the configuration via at least one of the transceiver or the antenna.

12. An apparatus for wireless communication at a network node, comprising:

a memory; and at least one processor coupled to the memory and, based at least in part on information stored in the memory, the at least one processor is configured to:

transmit an indication of a network energy saving (NES) mode, wherein the NES mode is supported by at least one of the network node or a user equipment (UE); and obtain a configuration for at least one of an RF sensing session, a set of sensing measurements, or a set of sensing signal transmissions based on the indication of the NES mode, wherein the configuration indicates one or more types of NES modes supported for each sensing measurement in the set of sensing measurements or for each sensing signal transmission in the set of sensing signal transmissions.

13. The apparatus of claim 12, wherein to obtain the configuration, the at least one processor is configured to receive the configuration from at least one of the UE or a network entity.

14. The apparatus of claim 12, wherein the at least one processor is further configured to:

obtain a request for the indication of the NES mode, wherein to transmit the indication of the NES mode, the at least one processor is configured to transmit the indication of the NES mode based on the request.

15. The apparatus of claim 12, wherein the NES mode is associated with at least one of a number of antenna ports, a type of sleep mode, a cell discontinuous transmission (DTX), an uplink (UL) state, or a downlink (DL) state utilized for at least one of the RF sensing session, the set of sensing measurements, or the set of sensing signal transmissions.

16. The apparatus of claim 12, wherein the at least one processor is further configured to:

transmit an update request associated with the configuration based on the obtainment of the configuration; and obtain an updated configuration for at least one of the RF sensing session, the set of sensing measurements, or the set of sensing signal transmissions based on the update request.

17. The apparatus of claim 12, wherein the configuration indicates that at least one of the network node or the UE is to perform at least one of the set of sensing measurements or the set of sensing signal transmissions independent of the NES mode supporting at least one of the set of sensing measurements or the set of sensing signal transmissions.

18. The apparatus of claim 17, wherein the indication of the NES mode indicates that the network node supports performance of at least one of the set of sensing measurements or the set of sensing signal transmissions independent of the NES mode supporting at least one of the set of sensing measurements or the set of sensing signal transmissions.

19. The apparatus of claim 12, wherein the configuration indicates one or more of:

at least one of the network node or the UE is to perform at least one of aperiodic sensing measurements or aperiodic sensing signal transmissions independent of the NES mode supporting at least one of the aperiodic sensing measurements or the aperiodic sensing signal transmissions, or at least one of the network node or the UE is to perform at least one of periodic sensing measurements, semi-persistent sensing measurements, periodic sensing signal transmissions, or semi-persistent sensing signal transmissions based on the NES mode supporting at least one of the periodic sensing measurements, the semi-persistent sensing measurements, the periodic sensing signal transmissions, or the semi-persistent sensing signal transmissions.

20. The apparatus of claim 19, wherein the NES mode is a semi-statically configured NES mode or a dynamically configured NES mode.

21. The apparatus of claim 12, wherein the at least one processor is further configured to:

transmit an error message based on at least one of the set of sensing measurements or the set of sensing signal transmissions not being performed due to overlapping NES mode restrictions.

22. The apparatus of claim 12, wherein the at least one processor is further configured to:

transmit, for the UE, the configuration for at least one of the RF sensing session, the set of sensing measurements, or the set of sensing signal transmissions.

23. The apparatus of claim 12, wherein the at least one processor is further configured to:

perform at least one of the set of sensing measurements or the set of sensing signal transmissions based on the configuration.

24. The apparatus of claim 12, further comprising at least one of a transceiver or an antenna coupled to the at least one processor, wherein to transmit the indication of the NES mode, the at least one processor is configured to transmit the indication of the NES mode via at least one of the transceiver or the antenna.

25. A method of wireless communication at a network entity, comprising:

obtaining an indication of a network energy saving (NES) mode, wherein the NES mode is supported by at least one of a set of network nodes or a user equipment (UE); and transmitting, for at least one of the set of network nodes or the UE, a configuration for at least one of an RF sensing session, a set of sensing measurements, or a set of sensing signal transmissions based on the indication of the NES mode, wherein the configuration indicates one or more types of NES modes supported for each sensing measurement in the set of sensing measurements or for each sensing signal transmission in the set of sensing signal transmissions.

26. The method of claim 25, wherein obtaining the indication of the NES mode comprises receiving the indication from at least one of: one or more network nodes in the set of network nodes or a second network entity.

27. A method of wireless communication at a network node, comprising:

transmitting an indication of a network energy saving (NES) mode, wherein the NES mode is supported by at least one of the network node or a user equipment (UE); and obtaining a configuration for at least one of an RF sensing session, a set of sensing measurements, or a set of sensing signal transmissions based on the indication of the NES mode, wherein the configuration indicates one or more types of NES modes supported for each sensing measurement in the set of sensing measurements or for each sensing signal transmission in the set of sensing signal transmissions.

28. The method of claim 27, wherein obtaining the configuration comprises receiving the configuration from at least one of the UE or a network entity.

* * * * *